United States Patent [19]

Abel

[11] 3,876,953

[45] Apr. 8, 1975

[54] MULTICHANNEL FM RECEIVER

[76] Inventor: William E. Abel, 12203 S.W. Tryon Hill Rd., Portland, Oreg. 97219

[22] Filed: June 8, 1973

[21] Appl. No.: 368,214

Related U.S. Application Data

[60] Division of Ser. No. 118,471, Feb. 24, 1971, Pat. No. 3,757,220, which is a continuation of Ser. No. 789,465, Jan. 7, 1969, abandoned, which is a division of Ser. No. 629,641, April 10, 1967, Pat. No. 3,462,688.

[52] U.S. Cl. ................ 329/103; 307/233; 307/234; 325/47; 325/344; 329/112; 329/106; 329/126

[51] Int. Cl. ............................................ H03d 3/22

[58] Field of Search ........... 329/102, 103, 112, 106, 329/126; 307/233, 234; 325/325; 330/83

[56] References Cited

UNITED STATES PATENTS

| | | | |
|---|---|---|---|
| 3,048,789 | 8/1962 | Herzog | 329/103 X |
| 3,053,985 | 9/1962 | Grammer et al. | 330/83 X |
| 3,163,826 | 12/1964 | Kemperp | 329/103 |

*Primary Examiner*—Alfred L. Brody

*Attorney, Agent, or Firm*—Wood, Herron & Evans

[57] ABSTRACT

A wireless multichannel FM receiver suitable for use in a classroom by students to selectively receive different instructional material simuntaneously transmitted on different channels by an instructor. The receiver includes an RF antenna; RF narrow bank filter circuit responsive to transmitted signals received by the antenna and selectively tunable to different channels for selectively passing received RF signals of only a single channel; an RF amplitude-limiter responsive to the RF filter circuit output and having a bandwidth including, but not necessarily limited to or centered on, all RF channels; and a detector responsive to the RF output of the amplifier-limiter and also having a bandwidth including, but not necessarily limited to or centered on, all of the RF channels.

1 Claim, 39 Drawing Figures

Figure 1A:
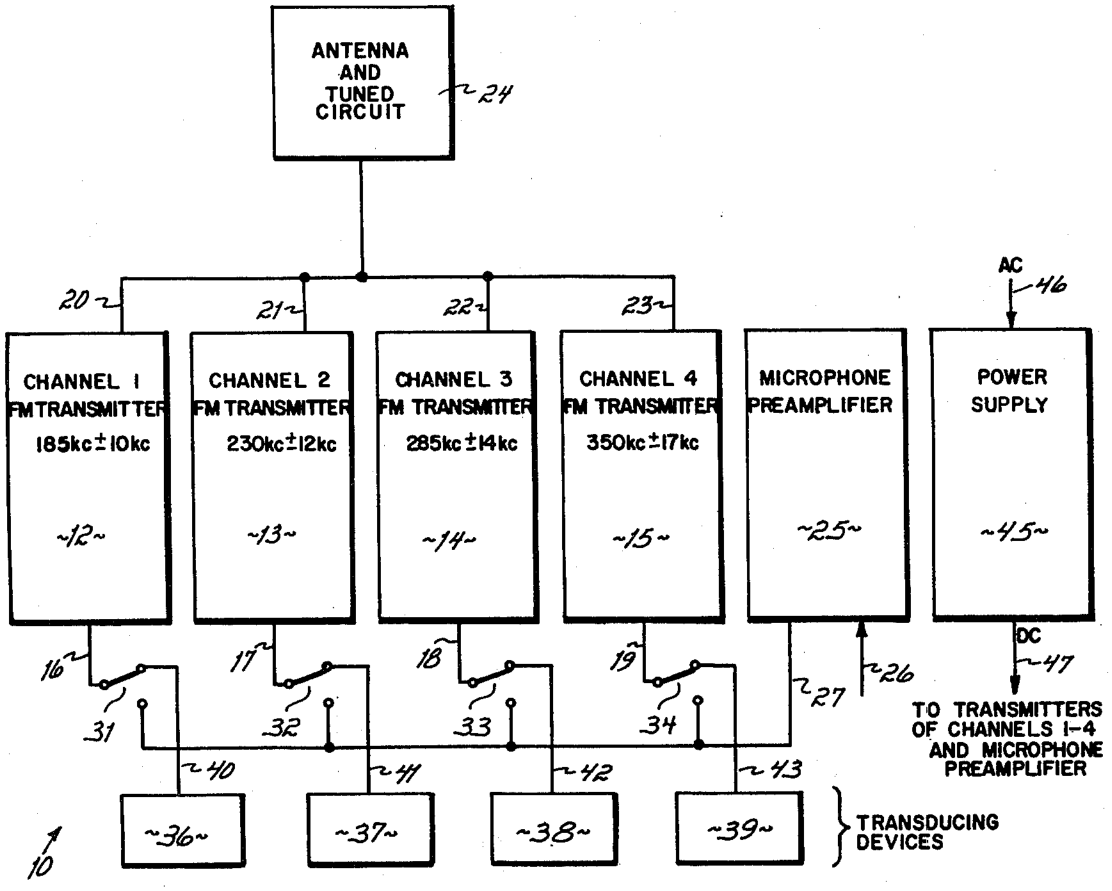

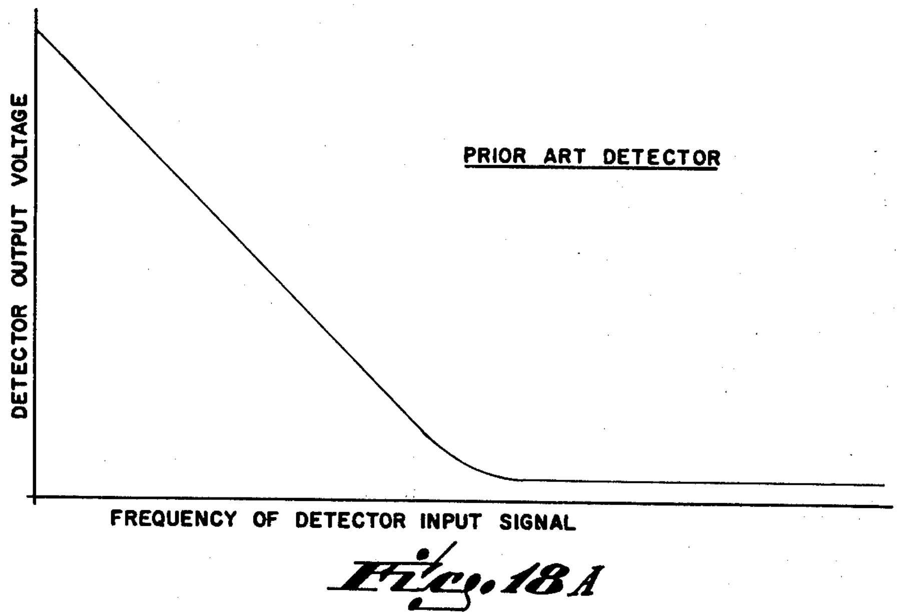
FIG. 18A
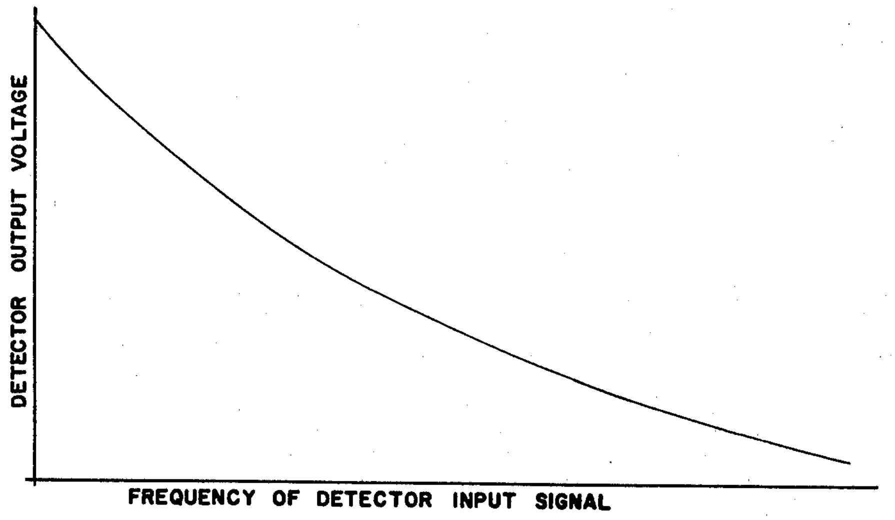
FIG. 18B
| CHANNEL | FREQUENCY | R124 | R125 | R127 | R128 |
|---|---|---|---|---|---|
| 1 | 185kc | 11.3k | 11.3k | 1540 | 20k-∞ |
| 2 | 230kc | 8870 | 8870 | 1370 | 20k-∞ |
| 3 | 285kc | 7150 | 7150 | 1130 | 20k-∞ |
| 4 | 350kc | 5760 | 5760 | 953 | 20k-∞ |
FIG. 8

MULTICHANNEL FM RECEIVER

This invention relates to frequency modulation communication systems, and more particularly to a multichannel frequency modulation communication system suitable for use in a classroom to enable an instructur to simultaneously provide different instructional material to diverse groups of students having their own individual receivers.

In recent years automation has been playing an increasingly larger role in the instruction of students. The pressures causing the introduction of automation into the teaching technique are many. Principal among these is the desire to ease the strain on the teacher shortage by substituting, where possible, machine instruction for the more usual type of instruction normally provided by teaching personnel. A further factor accelerating the trend to automated teaching aids is an appreciation by the teaching profession of the desirability of providing students having varying learning abilities and capacities with personalized instruction, that is, instruction at rates more nearly matching or approximating their respective learning abilities.

A specific illustration of an educational environment where automation is playing an increasingly important part is in the instruction of secretarial students studying the commercial subject of shorthand. In the instruction of shorthand it is not uncommon in a single shorthand class to have secretarial students whose respective proficiency levels vary over a wide range. For example, in an introductory shorthand course, students instructed for equal periods often vary in speed over a range of from 50 to 80 words per minute. To enable, a single instructor to simultaneously accommodate students demonstrating achievement levels varying over such a range, it has been proposed to provide a multichannel communication system suitable for classroom use which would permit the instructor to simultaneously provide each student with instructional material, such as a dictation exercise, at a rate which is approximately compatible with their individual skills. In accordance with such a proposal, the instructor simultaneously transmits a plurality of dictation exercises over different channels. The exercises are prerecorded at different word rates per minute, as for example at 50, 60, 70 and 80 words per minute, matching the achievement levels of the different student groups. The students, who are each equipped with a receiver, then select the appropriate channel carrying dictation at a rate corresponding to their own achievement level. In this manner, a single instructor, using one classroom, can simultaneously instruct students of varying abilities at rates which are geared to their respective achievement levels, thereby achieving economies in teach usuage as well as providing more personalized and meaningful instruction.

In designing a communication system of the above type, which permits a single instructor to simultaneously provide groups of students having different achievement leevels with instruction at rates matched to their respective needs, it is essential that there be a high degree of clarity and fidelity in the sound reproduction provided by the system. A student learning shorthand, who is attempting to practice his skills by participating in a shorthand exercise, is under substantial pressure. The student is engaging in an activity in which his performance is directly dependent on his ability to intensely and continuously concentrate throughout the duration of the entire exercise. If the student does not, he runs the risk of missing words which are not again repeated. A student operating under such conditions should not have his problems compounded by being subjected to recorded dictation exercises obscured by distractions such as audio frequency noice, cross-talk, hum and the like. Thus, for maximum educational benefit, it is essential that each student participating in a dictation exercise be able to hear the practice passage being transmitted on the channel to which he is tuned without distractions due to audio interference of various types.

It has, therefore, been an objective of this invention to provide a communication system which permits an instructor to simultaneously provide different groups of students in the same classroom with different instructional material, such system having maximum freedom from distractions due to audio frequency interference such as cross-talk and the like. In accordance with the principles of this invention, this objective has been accomplished by providing a multichannel wireless FM communication system employing a unique and fundamentally different approach to the interference problem in which the channels are spaced at increasingly larger intervals so as to avoid the production of high order difference sidebands which fall within the audio frequency information band and thereby interfere with the clarity of the audio information.

In a preferred embodiment of this invention the FM wireless communication system provided has four channels which are respectively centered at 185 k.c., 230 k.c., 285 k.c. and 350 k.c. In this preferred embodiment no difference sidebands are produced in the receiver by the beating together of adjacent or alternate channels, or the difference sidebands of adjacent or alternate channels. Consequently, no difference side-bands are generated which have amplitude levels sufficient to provide interference in the audio information band and thereby distract the student.

An advantage of the communication system of this invention, in addition to its interference-free characteristics, is that since it is wireless it does not present safety hazards which would otherwise arise due to the presence of a network of electrical wiring interconnecting the instructor's transmitting unit with the various student receiving stations.

Another very important consideration in the design of a multichannel communication system for a classroom instruction program of the type outlined above is that it be capable of use with peripheral equipment, such as microphones, earphones, and the like, whose impedances vary over a wide range, and further that such use be possible without the need for complex adjustments by the instructor and/or student. Flexibility is essential for a number of reasons. For example, it is not at all unlikely that a transmitter on different occasions is used with microphones having different output impedances. Nor is it unlikely that, in a single classroom, there are in use two or more different varieties of earphones, each variety possessing a different input impedance.

However, flexibility cannot be provided at the expense of operational simplicity. If the use of the system with different impedance peripheral equipment occasions complex adjustments to compensate for impedance variation, serious difficulties are encountered. For one thing, it cannot be expected under ordinary conditions that instructors and students possess a high degree of technical competence or experience in handling communications equipment. Consequently, if the system is to be satisfactory, in addition to being flexible, it must be simply designed so as to be usable by those unsophisticated in the handling of electronic equipment. Otherwise, faulty operation may ensue, resulting in damaged equipment. Operational simplicity, in addition to flexibility, is also necessary in order to keep to a minimum the time required for adjusting the equipment so as to render it ready for use. Otherwise, an undue amount of time, which should be devoted to student instruction, is wasted. Thus, if the advantages of using automated instructional aids are not to be dissipated, using the equipment must not require an instructor and/or student to spend undue portions of the instruction period either readying the equipment for use or maintaining it in operation once readied.

It has been a further and very important objective of this invention to provide a communication system suitable for educational and classroom purposes which is capable of use with a wide range of peripheral equipment, such as microphones, earphones, and the like, and yet which does not require that continuous or critical adjustments be made by the student and/or instructor. In accordance with additional principles of this invention, this objective has been achieved by utilizing, where appropriate in the system, amplifiers which automatically compensate for variations in the impedance of the peripheral equipment with which they are associated.

In a preferred embodiment of this invention, the transmitter is provided with a microphone preamplifier which includes a common-emitter transistor having a d.c. biasing and a.c. feedback network for making the voltage gain inversely proportional to the input impedance. Therefore, a constant output voltage from the amplifying stage is achieved, making adjustments unnecessary, regardless of whether a low impedance microphone having a low voltage output is utilized, or a high impedance microphone having a high voltage output is employed.

The preferred embodiment is further provided with a receiving unit having an audio output amplifier which includes a common-emitter transistor provided with a d.c. feedback path which enables the transistor to conduct at greater levels when headphones having low impedances are used, and to conduct at lower levels when high impedance headphones are used. This assures adjustment-free receiver operation by providing the appropriate level of polarization current for the headphones regardless of their d.c. resistance, while at the same time providing the proper conduction level for the transistor amplifying stage thereby insuring its operation in a Class A mode regardless of headphone impedance.

An advantage of both the microphone preamplifier and the audio output amplifier of the preferred embodiment, in addition to its impedance compensating characteristic which permits flexibility without operational complexity, is its utter structural simplicity. Specifically, each of the amplifiers requires only a single transistor stage to produce satisfactory operation.

A further desideratum in the design of a communication system of the type described is that it be both compact and relatively low in cost. The desirability of having low cost requires no explanation. Compactness, which is ordinarily desirable under most circumstances, is particularly desirable in a communication system adapted for classroom use in that it permits the student and teacher to make maximum use of the available desk space for writing purposes, free from the clutter of large and space consuming communications equipment.

This objective has been accomplished in accordance with further principles of this invention by utilizing very novel and unobvious concepts in the design of the receiver and transmitter. Specifically, the receiver design is predicated on the use, in a tuned radio frequency receiving (TRF) configuration, of a narrow band tunable filter in combination with a wide band detector and amplifier-limiter. This is in contrast to the prior art TRF receivers in which all the components are narrow band. By utilizing a wide band amplifier-limiter and detector in a TRF receiver, the added cost and complexity of additional band-narrowing circuitry are not present.

The transmitter design is predicated on the use of a unique antenna-transmitter coupling arrangement which is both compact and low in cost. Specifically, the multichannel transmitter utilizes an extremely simple antenna coupling scheme in which the tuned output circuits of the various channels are transformer coupled to different ones of a group of series connected high Q windings, the group of windings in turn being connected in parallel with the antenna output tank circuit. With such an arrangement a single antenna can be used to simultaneously service a plurality of channels without the cost and complexity of additional isolating tank circuits typically found in prior art antenna coupling arrangements.

It has also been an objective of this invention to provide a Class C radio frequency amplifier having a substantially linear amplitude versus frequency characteristic. This objective has been accomplished by the unique and unobvious step of driving the output tank circuit of a transmitter with a transistorized amplifying and switching arrangement having a low resistance in its output circuit and a differentiator in its input circuit. The combined transistor amplifying and switching configuration, when connected between the oscillator and output tuned circuit of an FM transmitter, automatically compensates for nonresonant oscillator pulsing of the output tuned circuit, maintaining the output voltage of the tuned circuit at a substantially constant level. This result is achieved in the combined amplifier-switch configuration by increasing the drive current pulses to the tuned circuit as the oscillator output moves further off resonance.

Another important objective of this invention has been to provide a pulse counting detector or demodulator for an FM system having a wide frequency range. This objective has been accomplished in accordance with certain additional principles of this invention by providing a detector with a transistor amplifying stage having both capacitive coupling and d.c. feedback to down-shift the voltage level of the incoming pulses as the input frequency increases. This pulse level downshift with increasing pulse frequency reduces the conduction angle per pulse of the transistor, causing the average d.c. current level of the transistor output per pulse to decrease, and thereby extend the detector frequency range. The decrease in conduction angle per pulse is not so extreme, however, as to completely offset the increased d.c. conduction level of the transistor per unit time which is caused by the increase in pulse rate.

A detector of the above type, in addition to broadening the bandwidth of the detector, also decreases the slop of the a.c. transfer characteristic in the high frequency range, that is, provides smaller voltage changes at higher frequencies for a given unit frequency change. This permits the detector output for frequency modulated carrier signals having the same percentage deviation, but different carrier frequencies, to remain substantially at the same level, thereby maintaining the audio output level of the receiving unit constant from one channel to another.

An additional principal objective of this invention has been to provide the FM receiver of the preferred embodiment with a limiter-amplifier which does not, by shifting the zero crossings, convert amplitude modulation, which may be present in the received signal, to frequency modulation. This objective has been accomplished in the receiver of this invention by employing an amplifier-limiter having a transistor stage which is direct coupled to the antenna tuned circuit. In this manner, it is possible to prevent shifts in the d.c. level or operating point of the transistor, due to amplitude variations in the received signal. Such d.c. level shifts typically occur in capacitively coupled stages due to charge variations on the coupling capacitor produced by the rectifying action of the amplifying device. By preventing these d.c. level shifts, zero crossing shifts do not occur and cause undesired frequency modulation.

It has been a further objective of this invention to provide, in the transmitter, Class C operation of a radio frequency amplifier which is responsive to a square wave input. This objective has been accomplished in the preferred embodiment of this invention by providing in the input circuit of a transistor amplifying stage, an RC pulse shaping network having a time constant which is approximately the same order or less of the period of the input pulse waveform. With such a pulse shaping network in the transistor amplifier input circuit, a decay is produced in the amplitude of the square wave which is effective to drop the amplitude below the d.c. bias level or operating point of the transistor for a given portion of each pulse half-cycle. This, in turn, correspondingly reduces the conduction angle of the transistor per pulse half-cycle to a relatively small fraction of the entire pulse period, such as, 30°–90°, characteristic of a highly efficient Class C amplifying stage.

Figure 1B:
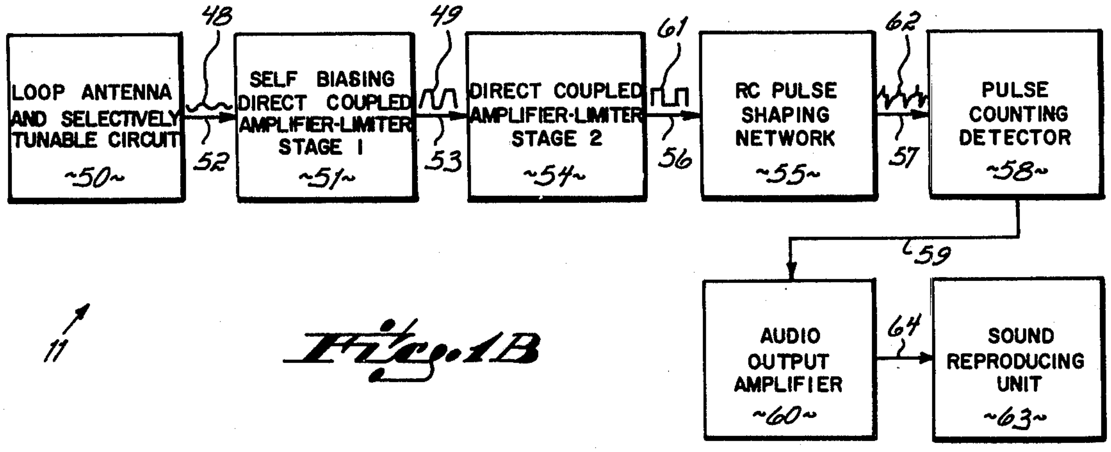
Figures 2, 4:
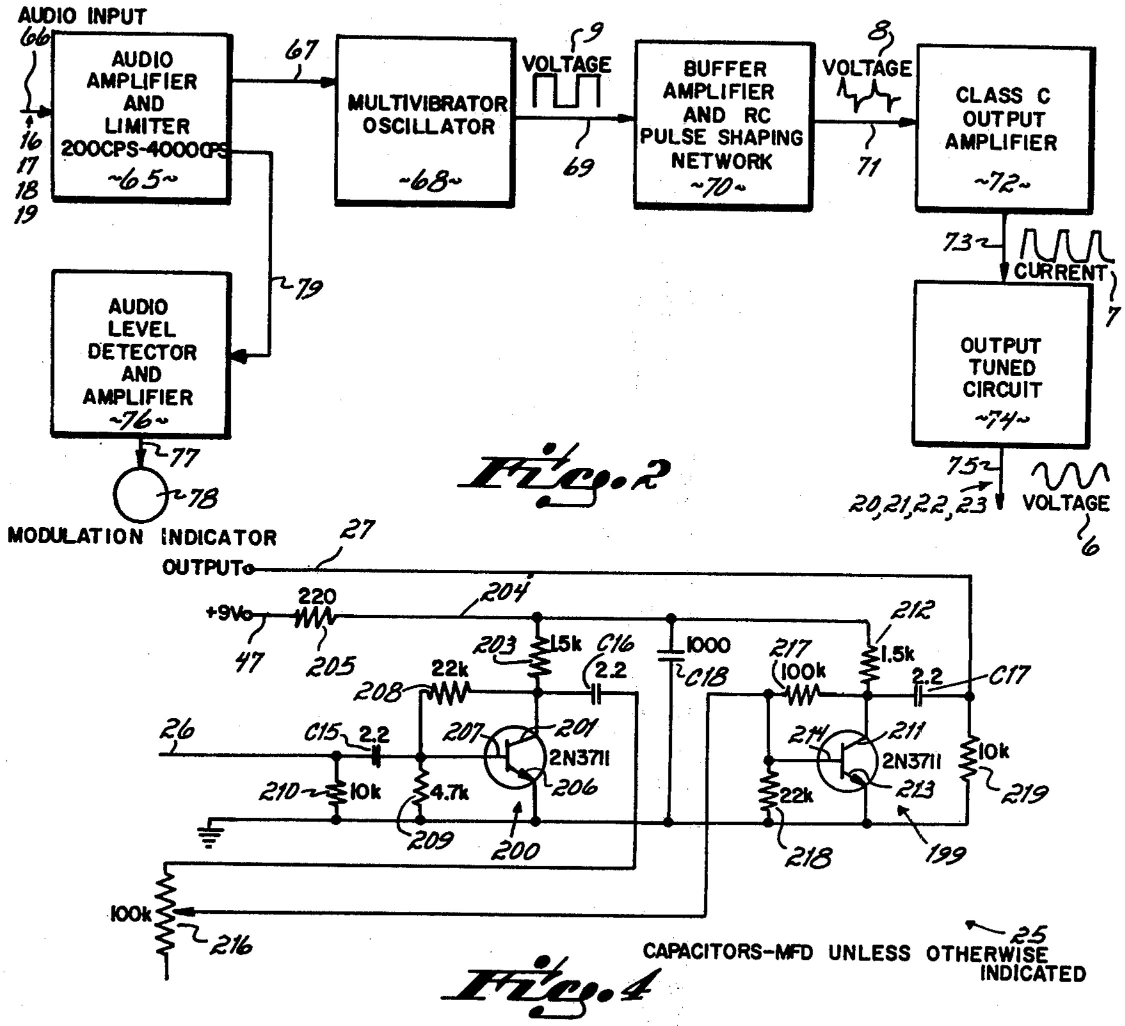
Figure 5:
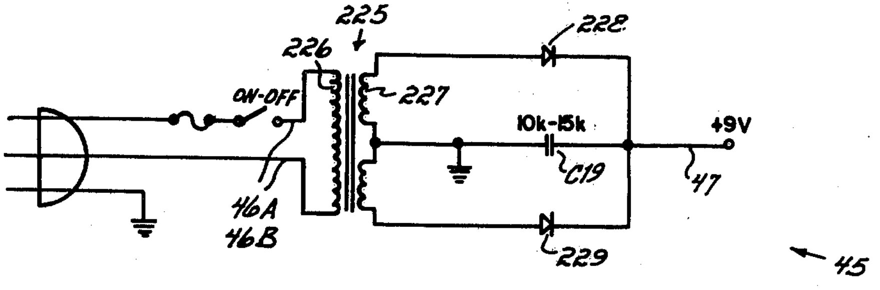
Figure 3:
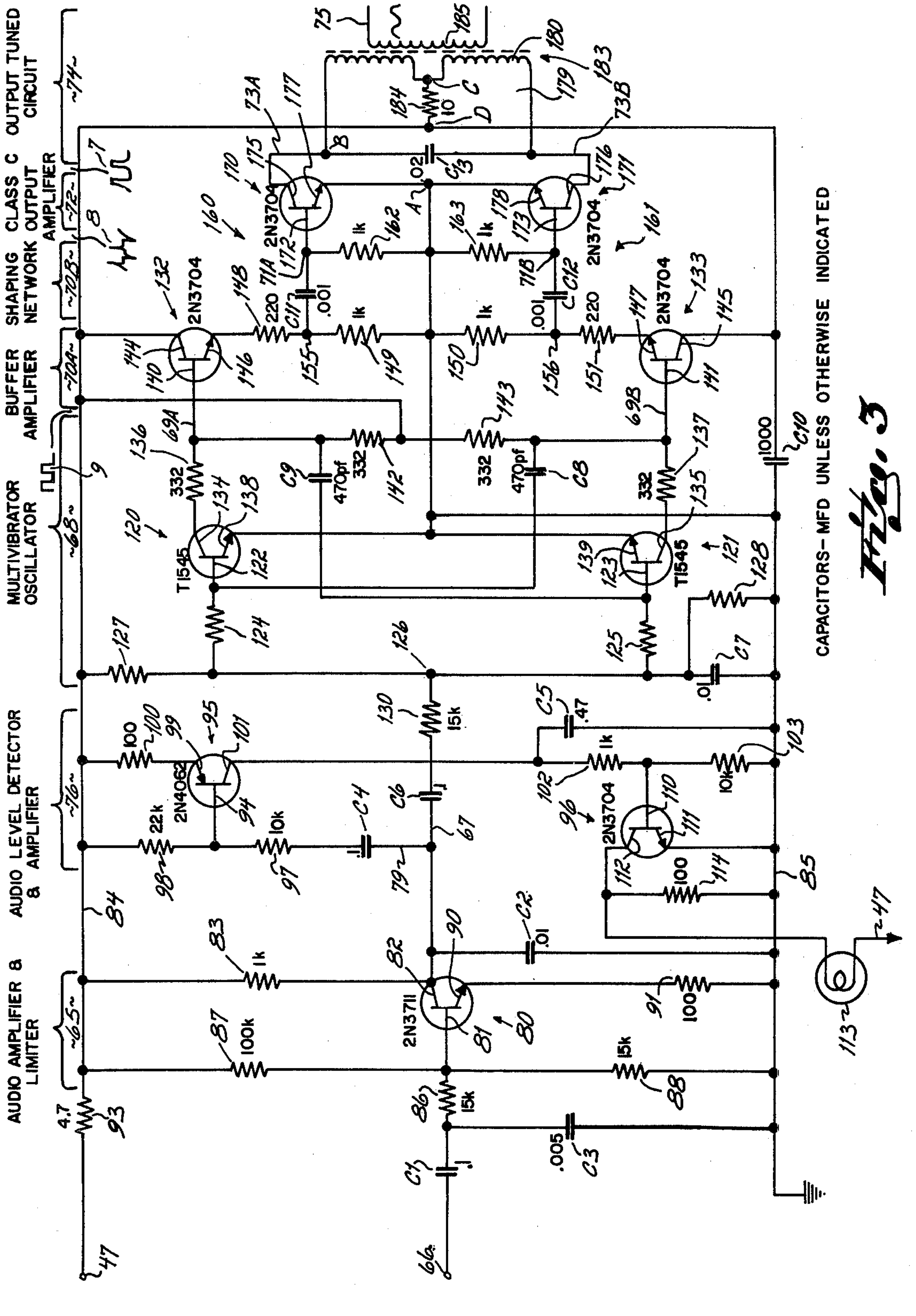
Figure 6:
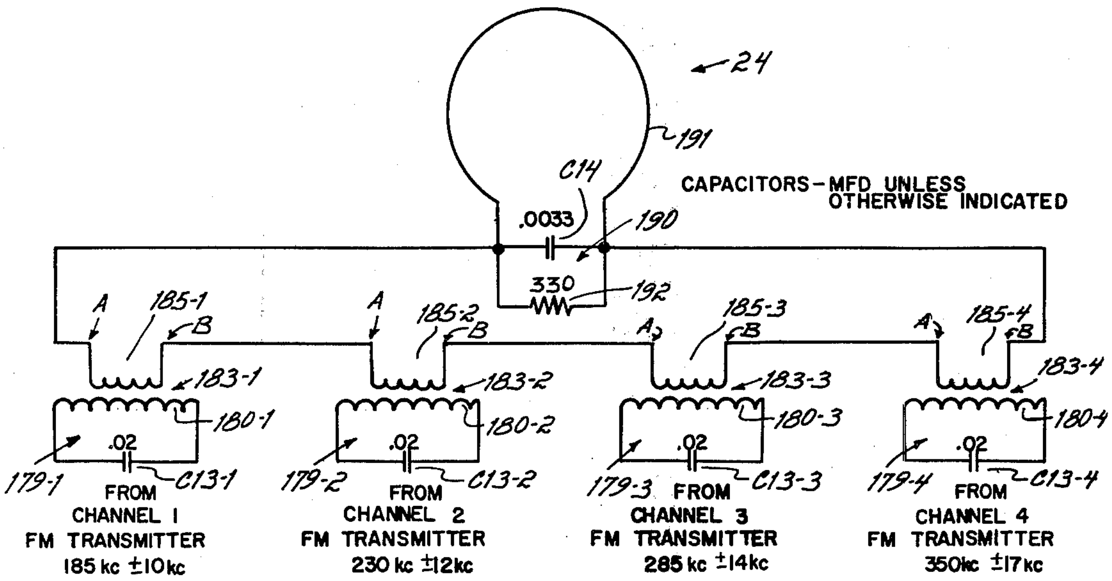
Figure 7:
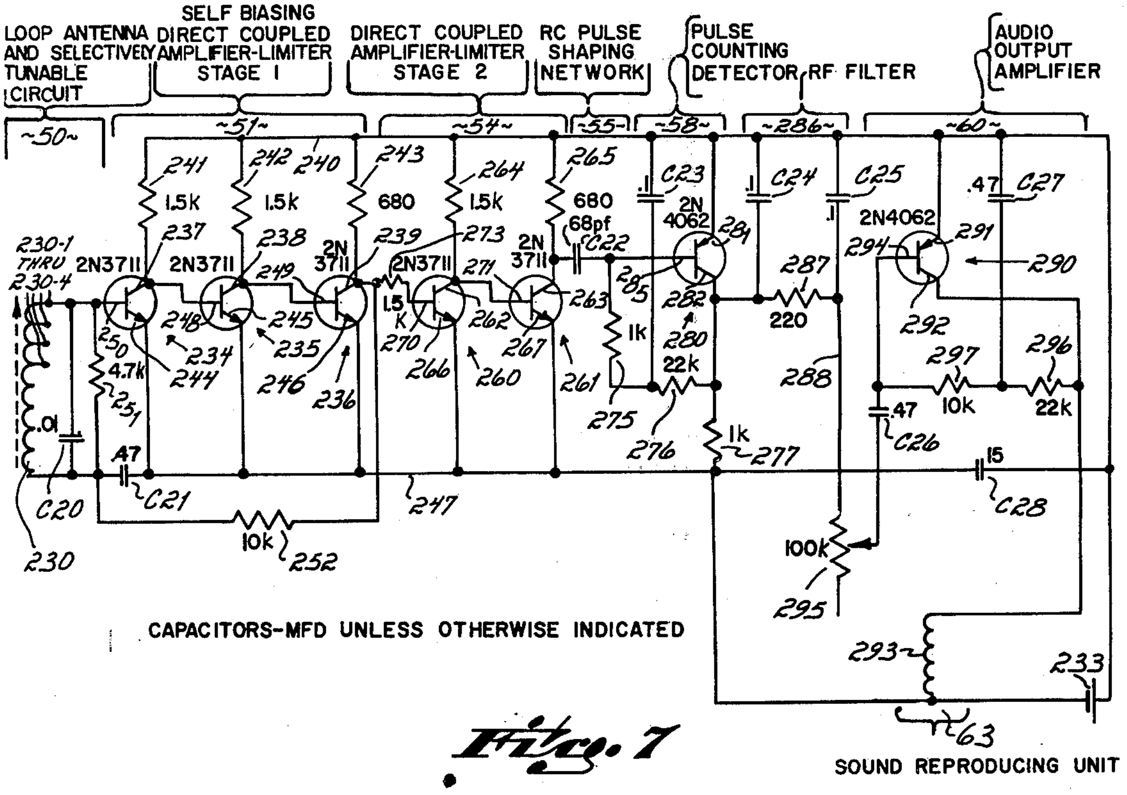
Figures 9A, 9B, 9C, 9D, 9E, 9F:
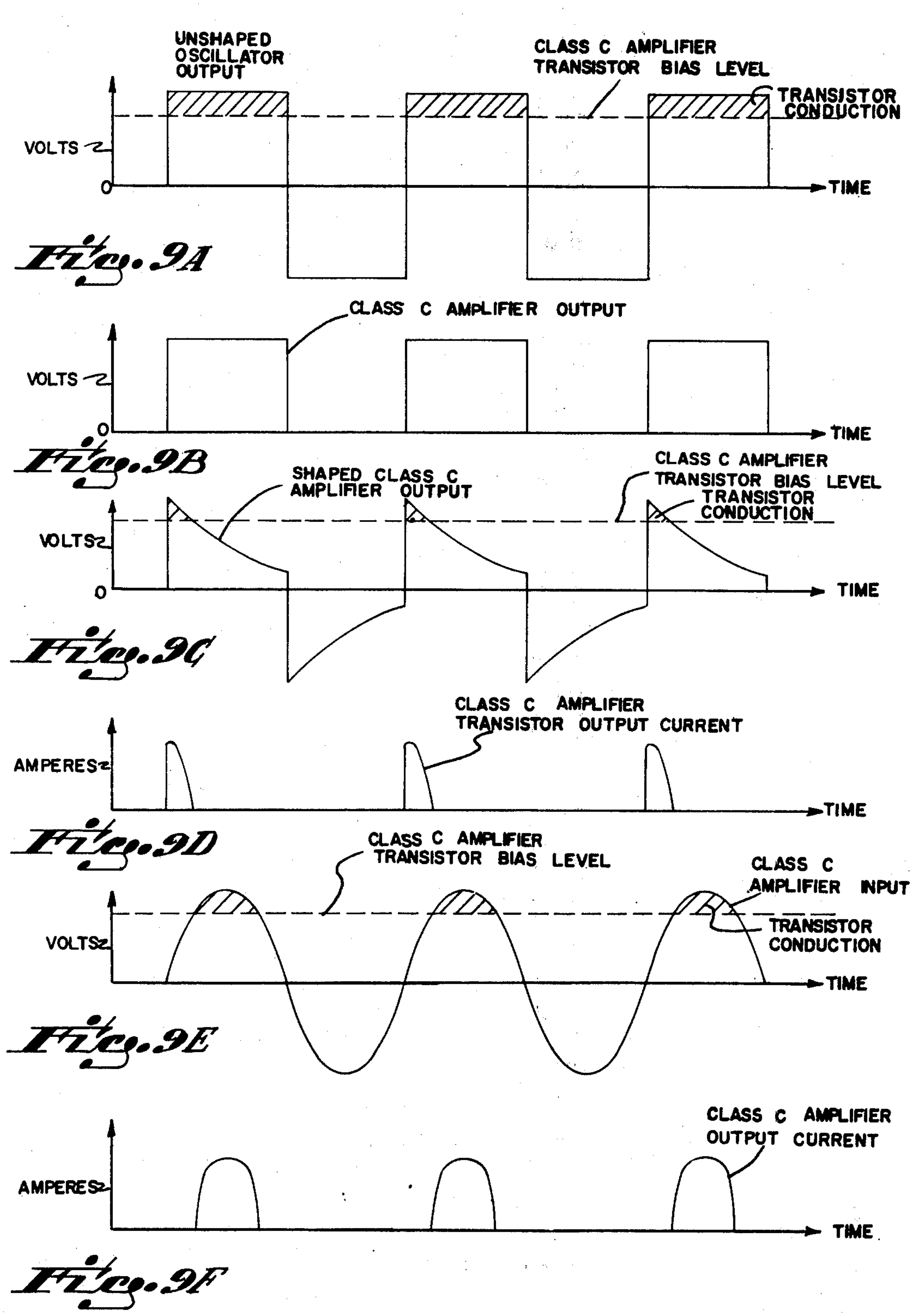
Figure 10A:
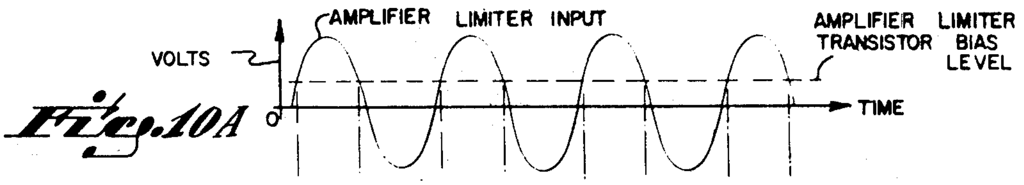
Figure 10B:
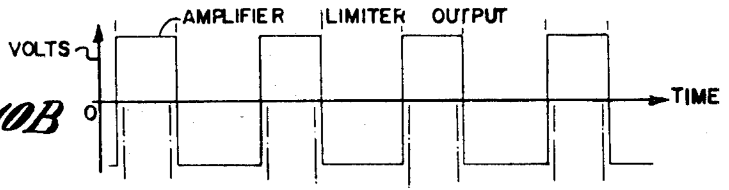
Figure 10C:
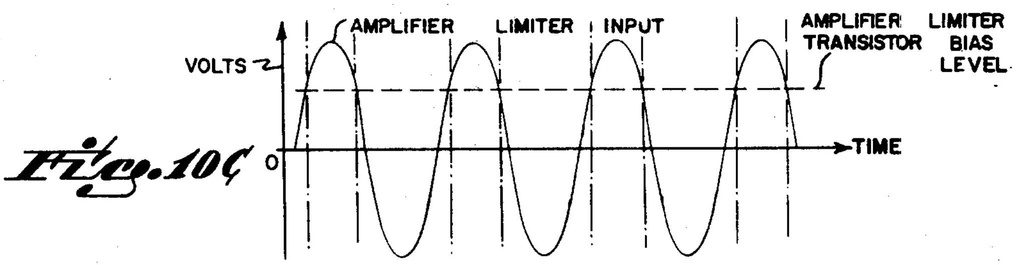
Figure 10D:
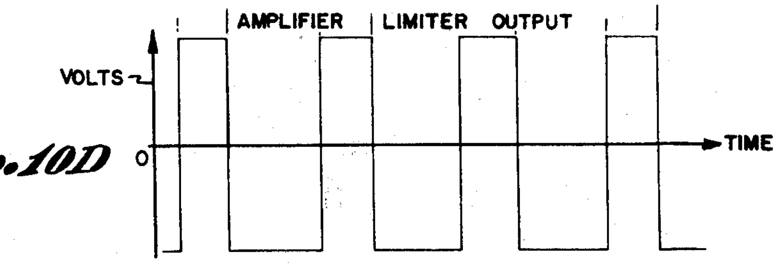
Figure 11A:
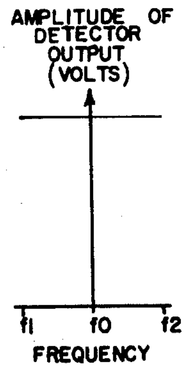
Figure 11B:
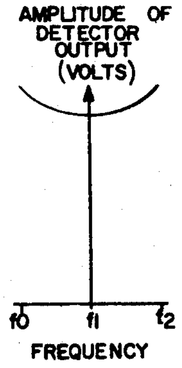
Figure 11C:
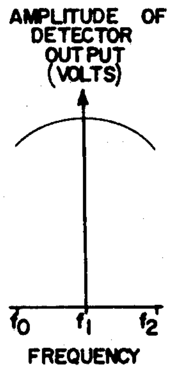

Other objectives and advantages of this invention will be more readily apparent from a detailed description of the invention taken in conjunction with the accompanying drawings in which:

FIGS. 1A and 1BB show schematically and in block diagram format, multichannel transmitter and receiver circuits, respectively, constructed in accordance with the principles of this invention, FIG. 2 shows schematically and in block diagram format a single channel transmitter circuit constructed in accordance with the principles of this invention, FIG. 3 shows a detailed schematic circuit diagram of a single channel transmitter constructed in accordance with the principles of this invention, FIG.4 shows a detailed schematic circuit diagram of a microphone preamplifier suitable for use in conjunction with the transmitter of this invention, FIG. 5 shows a schematic circuit diagram of a power supply suitable for use in conjunction with the multichannel transmitter of this invention, FIG. 6 shows a schematic circuit diagram of a preferred antenna coupling arrangement constructed in accordance with the principles of this invention, FIG. 7 shows a detailed circuit diagram of a receiver constructed in accordance with the principles of this invention, FIG. 8 is a chart correlating the various channels and their carrier frequencies with the preferred resistance values of certain oscillator resistors, FIGS. 9A-9F are waveform plots useful in understanding the operation and advantages of the Class C amplifier embodied in the transmitter of this invention, FIGS. 10A–10D are waveform plots useful in understanding the operation and advantages of the amplifier-limiter embodied in the receiver of this invention, FIGS 11A–11C are plots of frequency response characteristics useful in understanding the operation and advantages of the transmitter of this invention, FIGS. 12A–12C, FIGS. 13A–13C and FIGS. 14A–14C are waveform plots useful in understanding the operation and advantages of the Class C push-pull amplifier embodied in the transmitter of this invention, FIGS. 15A and 15B, FIGS. 16A and 16B, and FIGS. 17A and 17B are waveform plots useful in understanding the operation and advantages of the pulse-counting detector embodied in the receiver of this invention, FIGS. 18A and 18B are plots of a.c. transfer characteristics useful in understanding the operation and advantages of the pulse-counting detector of this invention,

GENERAL DESCRIPTION

A preferred embodiment of FM communication system employing the various inventive concepts of this invention is depicted generally in FIGS. 1A and 1B. This preferred embodiment is a multichannel system adapted to simultaneously transmit and receive a plurality of different audio frequency messages via frequency modulated radio frequency carriers, and includes a transmitting unit 10 and a receiving unit 11 depicted in FIGS. 1A and 1B, respectively. The transmitting unit 10 is preferably provided with four separate channels or transmitters 12, 13, 14 and 15 which are responsive, respectively, to audio frequency signal inputs on lines 16, 17, 18 and 19. The transmitters 12, 13, 14 and 15 provide outputs on lines 20, 21, 22 and 23, respectively, to a common radiating device or loop antenna and tuned circuit 24 for subsequent transmission to the receiving unit 11. The outputs of transmitters 12–15 are different frequency radio frequency carriers frequency modulated by the audio frequency signals input on lines 16–19, respectively. For reasons to be described, the center frequencies of adjacent carrier bands are spaced at increasingly larger intervals.

The transmitting unit 10 further includes a microphone preamplifier 25 responsive to a microphone input on line 26 for providing on line 27 an amplified microphone output. A set of ganged switch contacts 31, 32, 33 and 34, which are normally in the position shown, are provided to alternately and selectively connect either the amplified microphone output on line 27 or the audio outputs of a plurality of transducing devices 36, 37, 38 and 39 on lines 40, 41, 42 and 43 to the transmitters 12–15, respectively, via the transmitter input lines 16–19, respectively. The transducer devices 36-39 may be of any desired type such as phonographs, tape recorders, and the like. A power supply 45 is provided to convert the output of a conventional 117 a.c. wall outlet on line 46 to a direct current low voltage on line 47.

The receiving unit 11 includes a loop antenna and selectively tunable circuit 50 which is responsive to the radio frequency energy transmitted by the loop antenna and tuned circuit 24 of transmitting unit 10. The circuit 50 is tunable and functions as a frequency setable band-pass filter for selectively extracting any one of channels 1–4 transmitted bby the transmitting unit 10. The receiving unit 11 further includes a direct coupled amplifier-limiter 51. The amplifier-limiter 51 has a bandwidth greater than and including the total system bandwidth. By total system bandwidth as used herein is meant the radio frequency band containing channels 1–4, that is, the band containing the various radio frequency carrier bands output from the transmitters 12, 13,14 and 15. The gain of amplifier-limiter 51 is sufficiently large to convert the sinusoidal input 48 on line 52 from the loop antenna and selectively tunable circuit 50 to a relatively high and flattened wave output 49 on line 53.

The receiving unit 11 also includes a second direct coupled amplifier-limiter stage 54 for further amplifying and limiting the radio frequency signal received and passed by the loop antenna and selectively tunable circuit 50. The circuit 54, like the circuit 51, has a bandwidth at least coextensive with and preferably greater in the high frequency range than the system bandwidth and a gain sufficient to amplitude limit the input thereto.

An RC pulse shaping network 55 is provided which is responsive to the rectangular wave output 61 on line 56 from the second amplifier-limiter stage 54. The pulse shaping network 55 effectively differentiates the pulses on line 56, providing on line 57 a signal waveform 62 having a series of positive and negative spikes corresponding in number to the number of pulses input to the shaping network. A pulse counting detector 58 is included in the receiving unit 11 to frequency demodulate the FM radio frequency signal 62 input on line 57, providing on line 59 an audio frequency signal. This audio frequency signal is input to an audio amplifier 60. The amplifier 60 provides, on line 64, an amplified audio frequency signal of a strength sufficient to drive a sound reproducing unit 63, such as, a set of headphones, thereby producing an audible output representing the transmitted information message contained in the channel to which the receiving unit 11 is tuned.

In operation, depending on the position of switches 31–34 either the amplified audio frequency signal from the microphone which is present on line 27, or the audio frequency signals from the transducing devices 36–39, which are present on lines 40–43, is input to the transmitters 12–15 via lines 16–19, respectively. Assuming the switches 31–34 are in the position shown in FIG. 1A, the transmitter input lines 16–19 are connected to the output lines 40–43 of the transducing devices 36–39. The transducing devices 36–39 may, for example, be magnetic tape sound reproducing units which, when used with suitable transcribed material, provide dictation exercises for different groups of students in a single classroom. The dictation exercises from the tape reproducing units are preferably recorded at different speed levels or word per minute rates, corresponding to the different levels of achievement or proficiency of students in a single class. This, then, enables the individual students, each of which have a receiving unit 11, to tune their individual receivers to the appropriate channel having the desired dictation rate.

The audio frequency signals input to the transmitters 12–15 of channels 1–4 frequency modulate their respective radio frequency carrier frequencies, which preferably are 185 k.c., 230 k.c., 285 k.c., and 350 k.c. The frequency modulated radio frequency carrier signals output on lines 20–23 from the transmitters 12–15 of channels 1–4 are fed to the loop antenna and tuned circuit 24 where they are subsequently radiated to the antenna and selectively tunable circuit 50 of the receiving unit 11. Depending on the radio frequency carrier band to which the circuit 50 is tuned by the student, one of the four frequency modulated r.f. carriers simultaneously transmitted by the antenna 24 is successively input to the amplifier-limiter stages 51 and 54. In these stages the sinusoidal voltage waveform 48 of the received and passed frequency modulated r.f. carrier signal, which is present on line 52, is transformed to a substantially rectangular waveform 61 on line 56. The received and passed frequency modulated r.f. carrier signal, after such transformation, is differentiated by the shaping network 55, and then input to the detector 58 which frequency demodulates the differentiated r.f. signal 62, providing an audio frequency input on line 59 to the amplifier 60 where, following suitable amplification, an audio frequency input is provided to a set of headphones worn by the student.

It is to be understood that in practice one transmitting unit 10 is provided per classroom and one receiving unit 11 is provided per student. Thus, the instructor operating the transmitter, by varying the inputs on lines 16–19 to the transmitters 12–15 of channels 1–4, can provide different information on each channel which can then be selectively received by the various students. Alternatively, the instructor can, by using the microphone and transferring switches 31–34 from the positions shown, provide on each channel the same information. This interrupts the transmission of information from the transducing devices 36–39 and instead enables the instructor to simultaneously instruct and converse with all students regardless of the particular channel to which they presently are tuned. It is also possible, by selectively switching switches 31–34, for the instructor to instruct and converse only with those students tuned to the selected channel or channels.

TRANSMITTING UNIT

The transmitters 12–15 of channel 1–4 are each substantially identical in construction and operation. Consequently, the description of one of the transmitters is sufficient to fully described the structure and operation of all of the transmitters. Referring to FIG. 2, a schematic circuit diagram of a transmitter in block diagram format is provided. The transmitter includes an audio amplifier 65 having a bandwidth in the audio range extending preferably through the range of 200 cps to 4,000 cps. The amplifier 65 is responsive to the audio frequency signal input on line 66 which, in practice, is one of the lines 16–19 of FIG. 1A, and produces on line 67 an amplified audio frequency output. This output, in turn, is input to an r.f. oscillator 68 where it functions to frequency modulate the r.f. square wave oscillator output, the latter output constituting the r.f. carrier frequency and having a normal frequency of oscillation of either 185 k.c., 230 k.c., 285 k.c. or 350 k.c., depending on the channel with which the transmitter is associated.

The frequency modulated r.f. carrier wave 9 on line 69 is input to a buffer amplifier and RC pulse shaping network 70, where it is amplified and the resulting signal differentiated, providing on line 71 an amplified and differentiated frequency modulated carrier signal 8. A Class C output amplifier-limiter 72 is provided which is responsive to the buffer and shaping network output 8 on line 71. The amplifier and limiter 72 provides, on output line 73, a frequency modulated r.f. carrier having a current waveform 7 with positive pulses. The positive pulses of waveform 7 correspond to the positive spikes of the differentiated r.f. signal waveform 8 present on line 71.

A tuned circuit 74 is further provided for producing on line 75 an input to the antenna and tuned circuit 24. The input on line 75 is a sinusoidal voltage waveform 6 having a frequency corresponding to the frequency of the current spikes present in the signal 7 on line 73. In practice, the line 75 is one of the lines 20–23 depending on the channel with which the transmitter is associated.

In addition to the circuits 65, 68, 70, 72 and 74, a level detector and direct coupled amplifying circuit 76 is provided. The circuit 76 is responsive to the output of the audio amplifier 65 present on line 79, and provides on line 77 an input to an indicating lamp 78 for visually reflecting the level of the audio signal which is input to the transmitter on line 66.

AUDIO AMPLIFIER AND LIMITER

The audio amplifier and limiter 65, as shown more particularly in FIG. 3, includes an NPN transistor amplifier 80. Transistor 80 has a base electrode 81 which is coupled to the audio frequency input line 66 via a capacitor C1 and a resistor 82. Base electrode 81 is also coupled to the center of a voltage divider formed by resistors 81 and 88 which are connected between a grounded line 85 and a reference potential line 84, the line 84 in turn being connected through a current limiting resistor 93 to the output line 47 of the power supply 45. The voltage divider 87, 88 biases the transistor 80 to an appropriate operating point for insuring Class A amplifier operation. A bypass capacitor C3 connected between the grounded line 85 and the junction of capacitor C1 and resistor 82 is provided in the base circuit of the transistor 80 as a radio frequency bypass. The transistor 80 also includes a collector electrode 82 constituting the output of the amplifier-limiter stage 65. The collector 82 is connected via a load resistor 83 to the reference potential line 84 and to a grounded line 85 via a radio frequency bypass capacitor C2. The capacitor C2 also attenuates above 4KC, eliminating audio signals above this frequency. The transistor 80 further includes an emitter electrode 90 connected to the grounded line 85 via a biasing resistor 91.

The transistor 80 is biased such that at high levels of input signal amplitude on line 66 the transistor is driven into saturation, thereby amplitude-limiting the audio frequency output signal on line 82 for signals having large positive amplitudes. The biasing of transistor 80 is also such that the transistor is driven to cut-off, limiting the amplitude of the audio frequency output on line 62 for input signals on line 66 having large negative amplitudes.

In operation, positive-going increases in the signal level applied to audio amplifying input line 66 drive more conventional current into the base 81 of transistor 80, driving transistor 80 further into conduction. The increased conduction of transistor 80 draws more current through lead resistor 83, increasing the drop thereacross, and thereby lowering the potential at the collector 82. Collector 82 constitutes the output of the amplifier-limiter 65 and is input on lines 79 and 67 to the audio level detector and direct coupled amplifier 76 and the oscillator 68. Negative-going increases in input to the transistor base 81 drive the transistor toward cut-off, drawing less current through resistor 83, thereby raising the collector output voltage. When the increasing input signals to base 81 reach predetermined levels, further changes in collector voltage are not produced, the trnsistor 80 having been driven into cut-off or saturation depending on whether the transistor input is negative or positive, respectively, thereby producing ampltude-limiting action at high input signal levels.

AUDIO LEVEL DETECTOR AND AMPLIFIER

The audio level detector and amplifier 76 include a first transistor detecting and d.c. amplifying stage 95 and a second d.c. amplifying stage 96. Transistor amplifying stage 96 includes a base 94 which is coupled to the output line 67 of the audio amplifier-limiter 65 via a capacitor C4 and a resistive voltage divider consisting of resistors 97 and 98. Resistor 98 maintains the d.c. bias point of transistor 94 at the potential of the emitter 99, thus preventing conduction until the peak a.c. voltage at the base exceeds the base-emitter forward diode bias level which is approximately 0.6 volts. The transistor 95 further includes an emitter electrode 99 which is connected to the positive line 84 via a resistor 100, the function of which is to raise the transistor input impedance, and a collector electrode 101 which is connected to the grounded line 85 via a voltage divider formed by resistors 102 and 103. A capacitor C5 is connected between collector electrode 101 and the grounded line 85 and is provided as an audio frequency bypass. Transistor 99 functions as an audio amplitude detector and d.c. amplifier.

The second stage amplifying transistor 96 includes a base 110, which is connected to the midpoint of the voltage divider 102, 103 and constitutes the input to this transistor amplifying stage. Transistor 96 further includes an emitter electrode 111 connected directly to the grounded line 85 and a collector electrode 112. Collector 112 is connected to the reference potential line 47 of power supply 45 via an indicating lamp 113 which constitutes the load for transistor 96. A resistor 114 is connected between the collector 112 and the grounded second d.c. amplifying stage 96. Transistor amplifying stage 96 includes a base 94 which is coupled to the output line 67 of the audio amplifier-limiter 65 via a capacitor C4 and a resistive voltage divider consisting of resistors 97 and 98. Resistor 98 maintains the d.c. bias point at the emitter 99 potential, thus preventing conduction until the peak a.c. voltage at the base exceeds the base-emitter forward diode bias level which is approximately 0.6 volts. The transistor 95 further includes an emitter electrode 99 which is connected to the positive line 84 via a resistor 100, the function of which is to raise the transistor input impedance, and a collector electrode 101 which is connected to the grounded line 85 via a voltage divider formed by resistors 102 and 103. A capacitor C5 is connected between collector electrode 101 and the grounded line 85 and is provided as an audio frequency bypass. Transistor 99 functions as an audio amplitude detector and d.c. amplifier.

The second stage amplifying transistor 96 includes a base 110, which is connected to the midpoint of the voltage divider 102, 103 and constitutes the input to this transistor amplifying stage. Transistor 96 further includes an emitter electrode 111 connected directly to the grounded line 85 and a collector electrode 112. Collector 112 is connected to the reference potential line 47 of power supply 45 via an indicating lamp 113 which constitutes the load for transistor 96. A resistor 114 is connected between the collector 112 and the grounded line 85 to maintain a small continuous current flow through the lamp.

In operation, as the audio signal on line 67 increases, the audio signal to base 94 also increases. When the peak audio voltage to base 94 reaches the forward bias base-emitter potential of the transistor 95, transistor 95 starts to conduct. This conduction of transistor 95 charges capacitor C5 and thus establishes a d.c. voltage across C5 and, hence, across the voltage divider formed by resistor 102 and resistor 103. When the d.c. voltage at the base 110 of transistor 96 equals the base-emitter forward diode bias potential of transistor 96, transistor 96 commences conduction and thereby increases the brillance of the indicating lamp 113. Thus, when the peaks of audio voltage on line 79 are of sufficient amplitude, the audio level detector and amplifier 76 act to increase the brillance of the lamp 113. The lamp 113 thus serves as an audio voltage level indicator or, in this case, as a modulation level indicator.

MULTIVIBRATOR OSCILLATOR

The multivibrator oscillator 68 includes a pair of cross-coupled transistors 120 and 121. Transistors 120 and 121 are interconnected to provide astable or free-running operation at a center, or normal frequency, corresponding to the respective carrier frequency of the transmitter of which the oscillator forms a part, which can be altered or modulated by the amplified and limited audio frequency signal output on line 67 from the amplifier-limiter 65. Transistors 120 and 121 include bases 122 and 123 which are connected via coupling resistors 124 and 125, respectively, to a junction 126 of a voltage divider formed by biasing resistors 127 and 128 connected between the positive line 84 and the grounded line 85. The junction 126 in turn is coupled to the output of the audio amplifier and limiter 65 on line 67 via a resistor 130 and a coupling capacitor C6. A capacitor C7 connected between the junction 126 and the grounded line 85 functions to bypass radio frequencies as well as to limit the high frequency audio response. The base electrodes 122 and 123, in addition to being connected to the resistors 124 and 125, are also capacitively coupled via capacitors C8 and C9 to the lines 69B and 69A. Transistors 120 and 121 further include collectors 134 and 135 which are connected, via resistors 136 and 137, to line 69A and 69B which constitute the complimentary outputs of the multivibrator oscillator 68 as well as the inputs to the amplifier transistor stages 132 and 133 of the buffer amplifier 70A. Transistors 120 and 121 further include emitter electrodes 138 and 139 which are connected directly to grounded line 85.

In practice, the resistors 124, 125, 127 and 128 and the capacitors C8 and C9 are selected such that the multivibrator oscillator 68 will have as its normal or center oscillating frequency when unmodulated, the carrier frequency of the channel with which it is associated. For example, if the oscillator 68 is used with the channel 1 transmitter 12, resistors 124, 125, 127 and 128 and the capacitors C8 and C9 are selected so that the oscillator, when unmodulated, oscillates at 185 k.c. The chart of FIG. 8 correlates preferred resistance values of resistors 124, 125, 127 and 128 for each of the preferred carrier frequencies of channels 1–4 when capacitors C8 and C9 are equal to 470 micromicrofards.

The resistor 128 functions as a trimmer, and consequently its resistance in a particular oscillator is subject to variation.

In operation, if the instantaneous audio signal input to the transmitter on line 66 has a large positive amplitude, the signal input to the base circuit resistors 124 and 125 of transistors 120 and 121 at junction 126 has a relatively low value due to the inversion by the audio amplifier and limiter 65. This low level signal at junction 126 causes the capacitors C8 and C9 to charge more slowly, in turn decreasing the frequency of operation of the multivibrator oscillator 68, thereby producing frequency modulation. In like manner, if the amplitude of audio input signal present on transmitter input line 66 is at a relatively large negative amplitude level, the signal level at the junction 126 is relatively high. This high signal level causes the capacitors C8 and C9 to charge more rapidly than the previous example, increasing the frequency of operation of the multivibrator oscillator 68 and thereby producing frequency modulation. The charge path for the capacitors C8 and C9 is through resistors 143 and 142, respectively, which interconnect the capacitors to the positive line 84.

BUFFER AMPLIFIER AND RC PULSE SHAPING NETWORK

The buffer amplifier and RC pulse shaping network 70 include a buffer amplifier 70A and a shaping network 70B. The buffer amplifier 70A includes a pair of balanced emitter follower NPN transistors 132 and 133 whose base electrodes 140 and 141, respectively, are directly coupled to the complimentary output lines 69A and 69B, respectively, of the multivibrator oscillator 68. The transistors 132 and 133 also include collector electrodes 144 and 145 which are connected to the positive line 84 and to one side of a capacitor C10 connected between the positive line 84 and the negative line 85. The transistors 132 and 133 further include emitter electrodes 146 and 147 which are connected to the grounded line 85 via voltage dividers formed by resistors 148 and 149, and resistors 150 and 151, respectively, which form the load resistors for transistors 132 and 133. The junction 155 of resistors 148 and 149 constitutes the output of buffer amplifying transistor stage 132, and the junction 156 of resistors 150 and 151 constitutes the output of buffer amplifying transistor stage 133.

In operation, the complimentary outputs of the multivibrator oscillator 68 present on lines 69A and 69B are input to the base circuits of transistors 132 and 133.

The complimentary inputs cause the transistors 132 and 133 to be driven in opposite directions, toward either saturation or cutoff, raising and lowering, respectively, the output of junctions 155 and 156 from the buffer amplifier transistor stages 132 and 133, respectively. For example, if multivibrator oscillator output lines 69A and 69B have high and low signal levels thereon, respectively, transistor 132 is driven toward saturation while transistor 133 is driven toward cut-off, producing at junctions 155 and 156 high and low level complimentary outputs.

The function of the buffer amplifying stage 70A is to reduce the loading on the multivibrator oscillator due to its high impedance input, and to provide a low impedance output capable of driving the output transistors 170 and 171.

The shaping network 70B which constitutes the second portion of the buffer amplifying and RC pulse shaping network 70 includes pulse shapers 160 and 161. The pulse shaper 160 includes a capacitor C11 and a resistor 162 connected between the grounded line 85 and the output junction 155 of the buffer amplifying transistor stage 132. The pulse shaper 161 includes a capacitor C12 and a resistor 163 connected between the grounded line 85 and the output junction 156 of the buffer amplifying transistor stage 133. The outupts of the pulse shapers 160 and 161 are taken at the junction 71A of the capacitor C11 and resistor 162 and at junction 71B between capacitor C12 and resistor 163, respectively. In practice, for reasons to be described hereafter, the time constants of the pulse shapers 160 and 161 are selected to be of approximately the same order or less than the period of the multivibrator oscillator at its respective carrier frequency. with the RC constant of the pulse shapers so chosen, a rectangular wave input on junctions 155 and 156 of the type shown in FIG. 9A, produces on output junctions 71A and 71b the distorted wave form of FIG. 9C characterized by a decaying amplitude. In addition, the values of resistors 162 and 163 are selected to provide, at the operating signal input level, the necessary drive current for the transistor amplifying stages of the Class C amplifier 72 to be described later.

The signals present at junctions 155 and 156 are of substantially the same amplitude and opposite polarity. Consequently, the output signals of the pulse shapers 160 and 161 at junctions 71a and 71b are of substantially the same magnitude and opposite polarity.

CLASS C AMPLIFIER

The class C output amplifier and limiter 72 includes a pair of NPN transistors 170 and 171 connected in push-pull configuration. The transistors 170 and 171 include grounded emitters 177 and 178, and base electrodes 172 and 173 which are coupled directly to the output junctions 71A and 71B of pulse shapers 160 and 161, respectively. The transistors 170 and 171 further include collectors 175 and 176 connected to a tuned circuit 179 via lines 73A and 73B, respectively.

The push-pull amplifier transistor stages 170 and 171, in conjunction with the pulse shapers 160 and 161, cooperate to provide a very unexpected and extremely useful result. Specifically, they cooperate to produce Class C amplifier operation of the amplifiers 170 and 171 notwithstanding the output from the buffer amplifier stage 70A at junctions 155 and 156 has a rectangular wave form. When power is to be developed by a radio frequecy amplifier, it is desirable to operate the amplifier in a Class C mode, that is, operate it at a conduction angle of 180° or less. This mode of operation is desirable due to the high efficiency of Class C operation, the smaller the conduction angle the higher being the efficiency.

In a conventional capacitively coupled amplifier having a biasing resistor in its input circuit, when a sine wave of the type shown in FIG. 9E is input, a d.c. bias is established across the coupling capacitor due to the rectifying action of the emitter-base junction of a transistor or the grid-cathode diode of a vacuum tube. The time constant of the coupling capacitor and biasing resistor network in the conventional capacitively coupled circuit is chosen to be considerably longer than the period of the oscillator at the operating frequency. For example, the time constant is approximately 10–1,000 times the period of the oscillator. The bias resistor is also chosen in the conventional circuit to provide the necessary drive current for the amplifying device at the operating input signal level.

With a sine wave input (see FIG. 9E) to a conventional amplifier having such a d.c. bias level established by the the coupling capacitor and rectifying amplifier action, the amplifier device conducts only when the input signal exceeds the d.c. bias level, thereby providing the amplifying device with a current waveform of the type shown in FIG. 9F. Such a current waveform clearly characterizes Class C operation.

However, when the conventional capacitively coupled amplififer having a d.c. bias level shown in FIG. 9A has input thereto a square wave signal, the amplifier, whether a transistor or a vacuum tube, conducts when the positive one-half cycle amplitude exceeds the bias level, which for a square wave is during the entire positive one-half cycle as shown in FIG. 9B. Thus, when the input waveform is a square wave, it is clear that the amplifier conducts for 180° of each cycle, which is borderline Class C operation and, hence, not particularly efficient. Thus, using the conventional capacitively coupled amplifier wherein the time constant of the coupling capacitor and bias resistor is substantially larger than the period of the oscillator frequency, it is only possible, with a square wave input, to have relatively inefficient, borderline Class C operation.

However, in accordance with the principles of this invention, by selecting the time constant of he coupling capacitor and bias resistor located in the input circuit of the amplifier stage to be the same order or less than the period of the oscillator operating frequency, it is possible to have very efficient Class C operation with a square wave input. Specifically, with the time constant so chosen, the square wave of FIG. 9A, when input to the pulse shapers 160 and 161 constituting the input circuit of amplifiers 170 and 171, produces an output on junctions 71A and 71B having a voltage waveform of the type shown in FIG. 9C. Referring to FIG. 9C, it will be observed that the amplitude of the shaped waves decaysand, therefore, exceeds the d.c. bias level established across the coupling capacitor for only a very limited portion of each half-cycle as, for example, 5° to 90°. Consequently, the transistor amplifier stages 170 and 171 conduct for a correspondingly limited period, producing the current waveform shown in FIG. 9D characterized by pulses having a width of 5° to 90°. Such amplifier action constitutes very efficient Class C operation.

Thus, the shaping circuits 160 and 161 transform the buffered and amplified square wave pulses output on junctions 155 and 156 from the multivibrator oscillator 68 (see FIG. 9A) to the distorted waveform of FIG. 9C causing the push-pull transistor amplifiers 170 and 171 to operate in a very efficient Class C mode, providing on lines 73A and 73B signals having a current waveform of the type shown in FIG. 9D. The signals input to the amplifiers 170 and 171 from junctions 71a and 71B are of like magnitude and of opposite polarity. Consequently, the amplifying transistors 170 and 171 are driven into conduction alternately and into saturation alternately, producing outputs on lines 73A and 73B of like magnitude, but opposite polarity.

OUTPUT TUNED CIRCUIT

The tuned circuit 74 includes a pair of identical, similarly wound series connected windings forming the primary winding 170 of a center tapped transformer 183. The secondary winding 185 of transformer 183 constitutes the output of the tuned circuit 179 and is taken across lines 75A and 75b. The center tap of the primary winding 180 is connected via resistor 184 to the positive line 84. The primary winding 180 at its ends is connected to opposite sides of a capacitor C13, as well as to the output lines 73A and 73B of the push-pull transistor amplifying stages 170 and 171. The capacitor C13 and the primary winding 180 form the tank circuit 179.

By judicious selection of the push-pull amplifier transistor stages 170 and 171, it is possible to produce a very unobvious result, namely, the production of an FM transmitter having an amplitude versus frequency response which is substantially linear as shown in FIG. 11A or, if desired, up-sloping at its extremities as shown in FIG. 11B. The value in a transmitter output amplifier of an amplitude versus frequency response such as shown in FIG. 11B is that it can be used in a system where the receiver response characteristic is downsloping, such as is shown in FIG. 11C, for the purpose of providing compensation and thereby linearizing the net or system amplitude versus frequency response characteristic.

The downwardly sloping, non-linear amplitude versus frequency characteristic of the conventional transmitter depicted in FIG. 11C, which often is due to the selectivity of the tuned circuit in the transmitter including that of the output tank circuit, produces amplitude modulation as well as frequency modulation. This renders it more difficult for the receiver to produce a low distortion, noise-free information signal without resort to undue amplitude limiting action. In accordance with the principles of this invention, it is possible to produce an FM radio frequency signal that has a constant amplitude versus frequency response characteristic as shown in FIG. 15, or if desired, an upwardly sloping amplitude versus frequency response of the type shown in FIG. 16, thereby avoiding the disadvantages noted.

Specifically, amplitude versus frequency characteristics of the type shown in FIGS. 11A and 11B may be obtained by selecting for the Class C amplifying stage of the transmitter, amplifying devices having a low voltage drop when conducting, and using them in conjunction with a resistor in series with the load circuit. When the amplifying devices of the Class C amplifier stage, such as the transistors 170 and 171 of the Class C amplifier 72 depicted in FIG. 3, are so chosen, the transistors function essentially as switches, producing large pulses of current on lines 73A and 73B each time the transistors conduct. The value of these current pulses is established by the voltage drop across resistor 184. The amplitude of the current of such pulses increases as the input to the Class C amplifier stage 72 on lines 71A and 71B moves away from the resonant frequency of the tank circuit 179 to which the amplifier output lines 73A and 73B are connected, thereby enabling the peak output voltage of the tank 179 taken across secondary winding 185 to be maintained at a value approximating that at the resonant frequency of the tank 179 even when the frequency of the radio frequency signal on lines 73A and 73B driving the tank circuit is off resonance.

For an understanding of why the current pulses through the amplifying transistors 170 and 171 increase as the frequency of the multivibrator output moves off resonance, it is useful to consider two operating conditions, namely, the resonant condition and the non-resonant condition. If it is first assumed that the frequency of multivibrator 68 operation is equal to the resonant frequency of the tank circuit 179, the transistor 170 switches to its conducting state at a point in the tank 179 oscillation cycle where the voltage between point C and point B across one-half of primary winding 180 is at a maximum (see FIG. 12C). With the potential between point B and point C at a maximum, the drop across the resistor 184 connected between the point D and point C must necessarily be low (see FIG. 12B). The voltage between point A and point B across the transistor 170 is also small (see FIG. 12A), the transistor having been selected to have a low emitter-collector drop during conduction. The small drop across the resistor 184 causes a correspondingly small current pulse to be passed by switching transistor 170 to the tank circuit 179. Thus, when the frequency of the multivibrator oscillator 68 is exactly equal to the frequency of the tank circuit 179, the current pulses passed by transistor 170, which are necessary to drive the tuned circuit 179 for producing the desired amplitude output level across secondary winding 185 output lines 75A and 75B, are small.

Figure 13A:
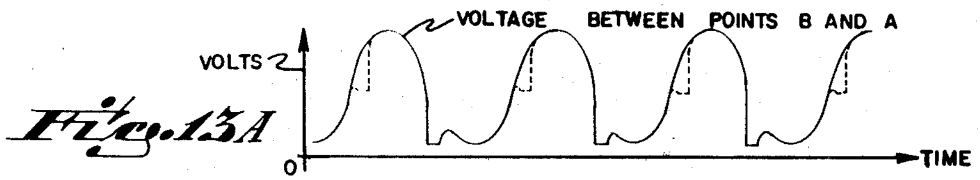

As the frequency of the multivibrator oscillator 68 varies off resonance, the conduction of transistor 170 occurs at a point in the operation of the tank circuit 179 when the voltage between point B and point C is less than its maximum (FIG. 13A). With the voltage across point B and point C less than its maximum the voltage drop between point C and point D across resistor 184 is higher (see FIG. 13B,) causing increased current to flow in the emitter-collector path of the transistor 170 through the resistor 184. This increased current more forcefully drives the tank circuit 179, maintaining the tank circuit voltage output across winding 185 lines 75A and 75B at the level existing at resonance. The potential between point B and point A across the transistor 170 is still small (see FIG. 12A) for the reason stated previously.

The further the frequency of multivibrator oscillator 68 is from the resonant value of the tuned circuit 179, the less the potential between point B and point C (see FIG. 14C) when the transistor 170 conducts. Consequently, the potential between point C and point D across the resistor is larger (see FIG. 14B), the transistor voltage between point A and point B remaining low (see FIG. 14A). The increased voltage across the resistor 184 causes greater current pulses to flow in the emitter-collector path of transistor 170 (see FIG. 14B) through the resistor, thereby maintaining the tank 179 voltage output taken across winding 185 lines 75A and 75B at its resonant value.

Figure 12A:
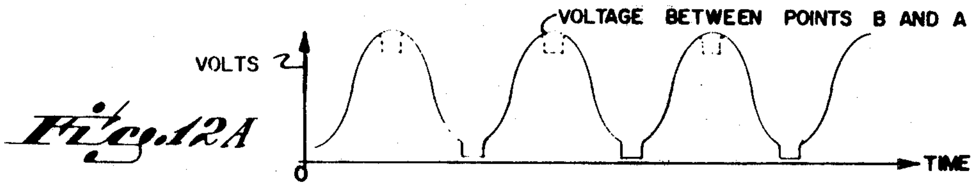
Figure 12B:
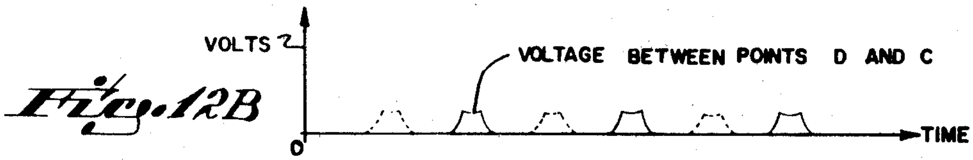
Figure 12C:
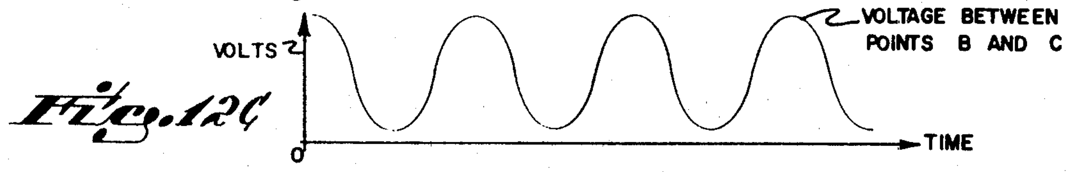
Figure 13B:
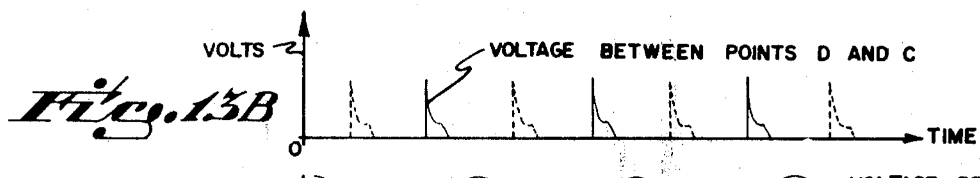
Figure 13C:
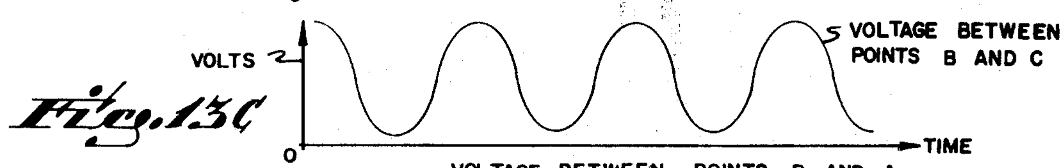
Figure 14A:
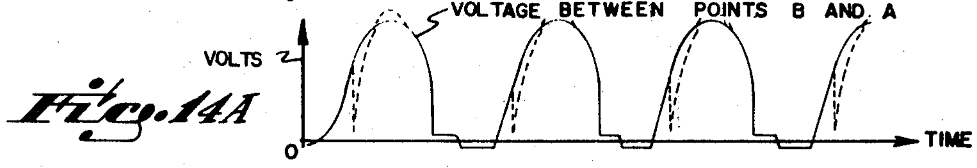
Figure 14B:
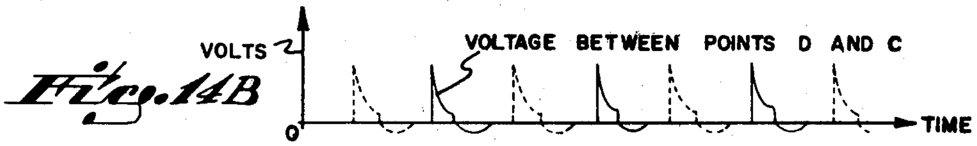
Figure 14C:
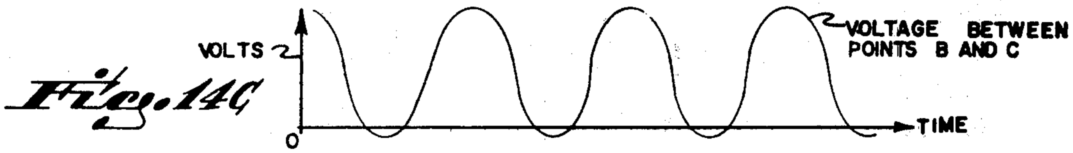

The above analysis of the interaction of resistor 184, transistor 170 and the portion of the primary winding 180 between point B and point C also describes the operation of the transitor 171 with respect to the resistor 184 and the other one-half of the primary winding 180. Thus, it will be appreciated that the voltage waveforms of FIGS. 12B, 13B and 14B represent only the voltage across resistor 184 due to current passed by transistor 170. There is an additional set of voltage waveforms shown in dotted lines in FIGS. 12B, 13B, and 14B which represent the voltage across resistor 184 caused by current flow through transistor 171. These two are phase shifted by 180° due to the alternate conduction of transistors 170 and 171. The dotted line waveforms of FIG.S 12B, 13B, and 14B reduce the voltage waveforms of FIGS. 12A, 13A and 14A, respectively, as shown in dotted lines.

Thus, by selecting transistors 170 and 171 which have a very low voltage drop during conduction and be selecting a resistor 184 having a sufficiently low value of resistance, it is possible to increase the current flow through the primary winding 180 as the output frequency of the multivibrator oscillator which drives the tank circuit moves further off resonance. Depending on the exact values of resistance of the load resistor 184 and the tank circuit 179 parameters, the increased current flow produced as the oscillator 68 moves off resonance can be made to just compensate for the additional drive current for exciting the tank circuit 179 which is needed due to off-resonant pulsing, thereby maintaining the output voltage level of tank 179 across lines 75A and 75B constant, producing the linear amplitude versus frequency characteristic of FIG. 11A.

Alternatively, it is possible, by making resistor 184 very small, to produce increased current pulses, as the driving source moces off resonance, which provide overcompensation. That is, it is possible to produce pulses which are in excess of that required to maintain the output voltage level of the tank 179 taken across the transformer secondary winding 185, lines 75A and 75B at a constant amplitude, thereby providing the amplitude versus frequency characteristic of FIG. 11B. Hence, a Class C amplifying stage has been provided which enables the amplitude of the output voltage from the tank circuit 179 taken across winding 185 to be maintained at a constant level or, if desired, increased as the frequency of the multivibrator 68 which drives the tuned circuit 179, moves away from the resonant value of the tank circuit 179.

As those skilled in the art will appreciate a point is eventually reached where the oscillator frequency is so far off resonance relative to the tank circuit 179 that it is no longer possible to maintain the amplitude of the tuned circuit 179 output across lines 75A and 75B at a constant level. However, in normal operation, the maximum oscillator frequency deviation from the resonant frequency of tank 179 is not sufficient to drive the circuit combination 72, 74 into this decreasing tank circuit 179 output range.

ANTENNA COUPLING

The radio frequency output of the transmitter depicted in FIG. 3 is taken across lines 75A and 75B of the secondary winding 185 of the transformer 183. In like manner, the radio frequency outputs of each of the transmitters 12–15 of FIG. 1A is taken across the counterpart of the secondary winding 185 of transformer 183 depicted in FIG. 3.

Referring to FIG. 6, the manner of coupling the radio frequency output of the transmitters 12–15 to the loop antenna and tuned circuit 24 is depicted. As shown in this Figure, the audio coupling arrangement includes four tank circuits 179–1 through 179–4 each having a capacitor C13–1 through C13–4 and an inductor 180–1 through 180–4. The tank circuits 179–1 through 179–4 are tuned to resonate at the respective carrier frequencies of the transmitters with which they are associated. Specifically, tank circuits 179–1 to 179–4 are tuned to resonate at 185 k.c., 230 k.c., 285 k.c. and 350 k.c. corresponding to channels 1–4. Windings 180–1 through 180–4 of the tank circuits 179–1 through 179–4 preferably are the primary windings of transformers 183–1 through 183–4 and, therefore, are inductively transformer coupled to the secondary windings 185–1 through 185–4. The transformer secondary windings 185–1 through 185–4 are connected in series. The series connected group in turn is connected across a tank circuit 190. The tank circuit 190 includes the paralled combination of a loop antenna 191, a capacitor C14, and a resistor 192. The tank circuit 190 is tuned to resonate at a frequency corresponding to the geometric mean of the resonant frequencies of the tank circuits 179–1 to 179–4, and is damped to a low Q, preferably about 2, by resistor 192. The inductance of the loop antenna is not critical.

The impedances of the secondary windings 185–1 through 185–4 are selected such that at the resonant frequencies of their respective tuned circuits, each winding has an impedance approximately equal to the impedances of the tuned circuit 190 at the same resonant frequency with the Q value previously noted. For example, the impedance of winding 185–1 is selected such that at the resonant frequency of tank circuit 179–1 with which it is associated, namely, 185 k.c., it is approximately equal to the impedance of tank circuit 190 at the same frequency, namely, at 185 k.c. with the Q value previously noted.

In addition, the winding 185–1 through 185–4 are selected to have a high Q value, preferably 10 or greater. Because of the relatively high Q value of the tank circuits 179–1 through 179–4 the impedances of the secondary windings 185–1 through 185–4 at frequencies other than their respective resonant frequencies, are very low. Consequently, at frequencies other than their respective resonant frequencies, the coils 185–1 through 185–4 behave essentially as short circuited windings. For example, at frequencies other than 185 k.c., winding 185–1 effectively has a very low impedance.

Inductively coupling the tank circuits 179–1 through 179–4 to the windings 185–1 through 185–4 provides isolation between the secondary windings. By such inductive coupling the secondary windings 185–1 through 185–4 can be operated without referencing one of their terminals of each of the secondary windings to a reference potential, such as, to ground. By eliminating the need for referencing the windings 185–1 through 185–4 the instantaneous potentials of adjacent terminals of adjacent windings are not superimposed on each other. Hence, the windings 185–1 through 185–4 are isolated.

The importance of isolation is apparent if one considers the consequence of grounding terminals A of the adjacent windings 185–1 and 185–2. Specifically, if terminal A of each of the windings 185–1 and 185–2 is grounded, the output of tank circuit 179–1 taken across winding 185–1 is short-circuited.

The inductive coupling of the windings 185 with their respective circuits 179 to provide the desired isolation, the provision of high Q values for the windings 185 produce a low impedance at nonresonant frequencies, and the matching of the impedance of the windings 285 at their respective resonant frequencies to the impedance of the tank circuit 190 at the same frequencies provide a very unobvious result. Namely, an extremely simple coupling arrangement between a plurality of transmitters and a single antenna is provided which does not require additional and complex tank circuits for isolation.

In operation, considering channel 1, the windings 185–2, 185–3 and 185–4 are approximately short circuits at the resonant frequency of the tank 179–1 because of the high Q values of these tank circuits. Consequently, the simultaneous transmission on channels 2, 3, and 4 concurrently with the transmission on channel 1 does not produce interference. In addition, since the impedance of the secondary winding 185–1 is matched at its resonant frequency with the impedances of tank circuit 190 at the same frequency, it is possible to provide a high efficiency power transfer between the tank circuit 179–1 and the tank circuit 190.

MICROPHONE PREAMPLIFIER

The microphone preamplifier circuit 25, which is depicted in FIG. 4, includes a first transistor 200 and a second transistor 199. The transistor 200 includes a collector electrode 201 connected via a load resistor 203 to positive line 204, line 204 in turn being connected via a decoupling resistor 205 to a positive reference potential line 47. Transistor 200 further includes an emitter electrode 206 connected directly to grounded line 85, and a base electrode 207 which is coupled via a network including a resistor 210 and a capacitor C15 to the microphone input line 26. The collector electrode 201 constitutes the output of the transistor amplifying stage 200. A resistor 208 connected between the collector electrode 201 and the base electrode 207 is connected to a resistor 209 connected between the base electrode 207 and the grounded line 85, forming a d.c. biasing network as well as an a.c. feedback network for the transistor 200.

The transistor 199 includes a collector electrode 211 connected to a positive line 204 via a load resistor 212, an omitter electrode 213 connected directly to the grounded line 85, and a base electrode 214. The base electrode 214 is coupled to the output of the transistor amplifying state 200 via coupling capacitor C16 and a volume controlling potentiometer 216. Resistor 217 coupled between the collector electrode 211 and the base electrode 214 in combination with the resistor 218 connected between the base electrode 214 and the grounded line 85 constitutes a biasing network as well as an a.c. feedback network for the transistor 199. The output of the transistor amplifying stage 199 is taken at the collector electrode 211 and is coupled through an RC network including capacitor C17 and resistor 219 to the preamplifier circuit output line 27.

A capacitor C18 connected between positive line 204 and ground is provided as an audio frequency bypass as well as for smoothing the power supply output.

The operation of the microphone preamplifier circuit 25 depicted in FIG. 4 is much the same as a conventional microphone preamplifier with the following important exception, namely, the gain of the circuit is dependent upon the impedance between lines 26 and 85. Since the impedance between lines 26 and 85 is the microphone input impedance, the gain of the microphone preamplifier is dependent upon the impedance of the microphone to which the circuit is connected. Specifically, the gain is inversely proportional to the microphone impedance. With a medium impedance microphone of approximately 3,000 ohms, the voltage gain of the first transistor amplifying stage 200 is approximately 15 due to the feedback action of the resistor 208 which forms a feedback voltage divider with the parallel combination of resistor 209, the microphone impedance and the transistor input impedance. With a low impedance microphone of approximately 150 ohms, the voltage gain of the first transistor amplifying stage is on the order of 60.

The value of using an amplifying stage on which the voltage gain is inversely proportional to the microphone impedance is that the amplifying stage compensates automatically over a very wide range for the variation in microphone impedance producing an output voltage at the collector 201 of transistor 200 which is relatively uniform in amplitude level. Without such compensation, the output of the amplifier stage is not constant over a varying range of microphone input impedances. This is because the voltage output from microphones is roughly proportional to the microphone impedance, low impedance microphones having a lesser voltage output than high impedance microphone of the same general type. Consequently, with conventional amplifiers the use of different microphones having varying impedances produced varying voltage inputs and, therefore, varying voltage outputs. With the circuit of FIG. 4 regardless of the microphone input impedance and, hence, the microphone output voltage, the voltage output from the first amplifier transistor 200 at collector 201 is substantially constant. For example, a 3,000 ohm microphone would have a voltage output of approximately $(3{,}000/150)^{1/2}$ relative to a 150 ohm microphone, or approximately four times that of a 150 ohm microphone. This factor of four in microphone output voltage between a 3,000 ohm microphone and a 150 ohm microphone is compensated by the transistor amplifying stage 200 by the varying voltage gain of the amplifying stage which is inversely proportional to the input impendance. In this case, a gain of 60 results when the 150 ohm microphone is used, and a gain of 15 results when the 3,000 ohm microphone is used. Thus, it is apparent tha a decrease in microphone impedance and hence, a decrease in microphone output voltage, is compensated by the transistor amplifying stage 200 by the increased voltage gain which occurs as the microphone input impedance decreases, the increases in gain being of such a magnitude as to offset the decrease in microphone impedance, producing at the output of the transistor amplifying stage 200 a substantially uniform voltage level regardless of microphone input impedance.

The waveform inversion produced by the first amplifying stage 200 is compensated by a similar wave form inversion introduced by the second amplifying stage 199. Thus, the second amplifying stage 199 functions to invert the inverted output of the first transistor stage 200 producing at the output terminal 27 a waveform which is in phase with the microphone output. In addition, because of the compensation for microphone input impedance introduced by the first amplifier stage 200, the output present on line 35, in addition to being amplified, is also substantially uniform regardless of the variations in microphone impedances.

The transistor amplifying stage 199, in addition to inverting the output of transistor amplifier stage 200 and thereby providing on line 27 an output waveform in phase with the microphone output waveform, also functions to increase the gain of the entire microphone preamplifier circuit 25 to a value of approximately 2,000 as is necessary for proper operation of the transmitters 12–15.

POWER SUPPLY

The power supply 45 depicted in FIG. 5 includes a transformer 225 having a primary winding 226 and a center tapped secondary winding 227. The primary winding 226 is connected, via a fuse and on/off switch, across a suitable source of a.c. potential such as provided by lines 46A and 46B which in use are connected to a conventional electrical wall outlet. The end terminals of the center tapped secondary winding 227 are connected via rectifying diodes 228 and 229 to the positive output reference line 47. The center tap of the secondary winding 227 is grounded. A capacitor C19 is connected between the center tap of transformer secondary winding 227 and the positive reference line 47 to smooth the output of the diodes 228 and 229, thereby providing on line 47 a full-wave rectified signal having a substantially constant d.c. voltage level. The reference potential line 47 is connected to the microphone preamplifier circuit 25 as well as to the transmitters 12, 13, 14, and 15.

A very important aspect of the receiver of this invention is the manner in which the various radio frequency channels are spaced. With reference to the receiver block diagram of FIG. 1A, it is noted that the carrier frequencies of adjacent channels are spaced at increasing intervals which bear a unique and predetermined relation to each other and to the frequency band of the information signal. Specifically, the channels are spaced so that the high order difference sidebands, which are produced in the receiver as a consequence of the different carrier frequencies beating together, do not lie in the information band.

The importance of the carrier frequency spacing arrangement embodied in the receiver of this invention is more readily apparent from a consideration of the conventional carrier frequency spacing approach found in the prior art. Specifically, in conventional multichannel frequency modulated, radio frequency communication systems, the carrier frequencies are normally spaced at constant frequency intervals. For example, in a multichannel system having three adjacent radio frequency channels, $F_1$, $F_2$ and $F_3$, the spacing between adjacent channels is normally a constant frequency differential $F_s$. Thus, $F_2 = F_1 + F_3$, $F_3 = F_2 + F_3$, and $F_3 = F_1 + 2F_s$. With the carrier frequencies so spaced, a receiver tuned to frequency $F_2$, which does not have sufficient selectivity to completely eliminate frequency $F_1$ and frequency $F_3$, presents to the detector frequencies $F_1$ and $F_3$ as sidebands of frequency $F_2$. The detector, in turn, produces two frequencies of approximately $F_s$. If $F_1$ and $F_3$ are spaced exactly $F_s$ from $F_2$, the difference sideband frequencies $F_s$ of the adjacent channels are exactly equal, and consequently, boat together to produce a difference frequency of zero, producing no interference in the information band.

However, with many practical FM systems, the frequencies $F_1$ and $F_3$, which are the channels adjacent to frequency $F_2$ on each side, are not spaced exactly $F_s$ from frequency $F_2$. Thus, the frequencies $F_1$ and $F_2$, and $F_2$ and $F_3$, when detected by the detector, beat together producing two difference frequency sidebands which are not at zero frequency. For instance, if frequencies $F_1$, $F_2$ and $F_3$ are 1,000 k.c., and 1,041 k.c., respectively, and the receiver is tuned to frequency $F_2$, the difference sideband frequencies of 20 k.c. and 21 k.c. are produced in the detector and boat together to produce a lower order difference sideband of 1 k.c. If the desired information band is, for example, 200 cps-3,000 cps, the 1 k.c. difference sideband produced by heating together the difference sidebands of adjacent channels causes undesirable interference in the information band.

If, however, the frequency spacing between the adjacent carrier frequencies is chosen in accordance with the principles of this invention the above-noted type of interference in the information band is materially reduced. Specifically, this interferences can be reduced by spacing the channels such that the spacing on one side of the frequency to which the receiver is turned is greater than the spacing on the other side by an increments in excess of twice the highest frequency of the information band.

For example, assume that the three frequencies, $F_a$, $F_b$, and $F_c$ of a multichannel system are spaced such that the spacing between frequencies $F_a$ and $F_b$ is 20 k.c. and the spacing between frequencies $F_b$ and $F_c$ is 30 k.c. Further assume that frequency $F_a$ is 1,000 k.c., frequency $F_b$ is 1,020 k.c., and frequency $F_c$ is 1,050 k.c. With a communication system having the above channel frequencies and spacing wherein the channel frequency intervals on either side of a given channel differ by an amount equal to twice the highest frequency in the information band, a detector tuned to frequency $F_b$ will produce first order difference sidebands of 20 k.c. and 30 k.c., neither of which are in the assumed information band of 200 cps–3,000 cps. In addition to the first order difference sidebands produced, the 20 k.c. and 30 k.c. sidebands beat together to produce a second order difference sideband of 10 k.c. which is also not in the assumed information band of 200 cps–3,000 cps. In like manner, the second order 10 k.c. difference sideband beats together with the first order 20 k.c. difference sideband to producce a still further sideband frequency of 10 k.c. which, too, is not in the information band. Thus, it is apparent that a carrier frequency spacing arrangement of the type utilized in the transmitter of this invention, in which the adjacent channels are spaced such as to avoid the production of high order difference sideband in the information band, produces relatively low interference in the receiver notwithstanding relatively unselective receiver filtering.

RECEIVER ANTENNA AND TUNED CIRCUIT

The loop antenna and tuned circuit 50 is depicted in FIG. 7 includes a winding 230 connected in parallel with a capacitor C20. The winding 230 has four taps 230–1 through 230–4 corresponding to channels 1–4 of the transmitter. Interconnection of taps 230–1 through 230–4 with the capacitor C20 alters the resonant frequency of the tank circuit 50, making the tank selectively tunable so as to correspond with the carrier frequencies of channels 1–4. Specifically, interconnection of taps 230–1 through 230–4 with the capacitor C20 causes the tank circuit 50 to resonate at carrier frequencies of 185 k.c., 230 k.c., 285 k.c. and 350 k.c., respectively.

FIRST STAGE AMPLIFIER-LIMITER

The self-biasing amplifier-limiter 51 includes three cascaded transistor amplifying and limiting stages 234, 235 and 236 having their collectors 237, 238 and 239 coupled to a positive line 240 via load resistors 241, 242 and 243, respectively, and their emitters 244, 245 and 246 coupled directly to a negative line 247. The collector electrode 239 of transistor 236 constitutes the output of the amplifier-limiter 51. Transistors 235 and 236 have bases 248 and 249 which are connected to the collectors 237 and 238 of transistors 234 and 235. The positive and negative lines 240 and 247 are connected across a suitable direct current source 233, such as a 1.4 volt battery housed in the receiver enclosure (not shown). The transistor 234 has a base electrode 250 which is directly coupled to the output line 52 of the loop antenna and tuned circuit 50. A capacitor C21 is connected between the line 247 and the junction of capacitor C20 and winding 230 to isolate the tank circuit 50 from the d.c. source 233.

A tuned circuit loading resistor 251 is connected between the base electrode 250 and the negative line 247. The function of resistor 251 is to establish the correct Q and bandwidth for the tuned circuit. A feedback resistor 252 connected between the collector electrode 239 of transistor 236 and the junction of capacitors C20 and C21 and the coil 230 establishes the d.c. bias level for the transistors 234, 235 and 236. The function of transistors 234, 235, and 236 is to provide a large amount of voltage gain for signals present on line 52.

SECOND STAGE AMPLIFIER-LIMITER

The amplifier-limiter 54 includes cascaded transistors 260 and 261 having collectors 262 and 263 connected to the positive line 240 via resistors 264 and 265, and emitters 266 and 267 connected directly to the negative line 247. The transistors 260 and 261 have bases 270 and 271 which are connected, respectively, to the output line 53 of the amplifier-limiter 51 via coupling resistor 273 and directly to the collector 262 of transistor 260. The output of the amplifier-limiter 54 is taken at the collector of transistor 263.

It is important to note that the transistor stages of both the amplifier-limiter stages 51 and 54 are directly coupled to their respective inputs. This direct coupling unobviously and substantially improves the interference rejection and AM rejection characteristics of the FM receiver particularly in the case when an FM detector is used in which only the positive going or only the negative going zero crossings are utilized in the detection or demodulation process. This direct coupling of amplifier-limiter 51 is also productive of improved interference rejection and AM rejection characteristics of a receiver when a "balanced" type FM detector is used, perfect balance in a practical detector being impossible.

To appreciate the value of directly coupling the transistor stages of amplifier-limiters 51 and 54 it is useful to consider the conventional RC coupling practices of the prior art amplifier-limiters. In a conventional single ended untuned RC coupled amplitude limiter it is necessary, if limiting action is to be used, to overdrive the amplifying stages so as to produce a rectangular wave output. As the input to the RC coupled amplitude-limiter becomes overdriven, the coupling capacitor develops a d.c. charge due to the rectifying action of the amplifying device whether it be a bipolar transistor, as shown in FIG. 7, or a vacuum tube. The value of the d.c. charge, of course, depends on the signal level or amplitude of the input to the amplitude-limiter. With an input signal which is amplitude modulated as well as frequency modulated the charge on the coupling capacitor varies with the amplitude modulation and, therefore, shifts the d.c. bias or input operating point of the amplifying device. This shift of the operation point of the amplifying device occurs in unison with the amplitude modulation.

As a consequence of shifting the amplifier operating point, the position of the positive going and negative going zero crossing of the input wave is shifted. This shaft in zero crossing with increased input signal amplitude is apparent from comparing the waveforms of FIGS. 10A, 10B, 10C and 10D. In FIG. 10A, a relatively low amplitude sinusoidal waveform is provided establishing a correspondingly low operation or bias point. When the amplitude of the input sinusoidal signal is above the operating point, the transistor conducts producing the rectangular waveform of FIG. 10B having positive and negative going zero crossings coincident with the point at which the positive and negative going portions of the input sinusoidal signal (FIG. 10A) cross the operating point or d.c. bias level. In FIG. 10C an input sinusoidal signal having a greater amplitude than that of the sinusoidal signal of FIG. 10A is shown which is effective to produce an operating point or d.c. bias level which is greater than that shown in FIG. 10A. With the operating point so shifted, a rectangular waveform of the type shown in FIG. 10D is produced. Since the operating point or d.c. bias level has been shifted by the increased amplitude input wave, the amplifying stage conducts for a shorter period producing narrower pulses (FIG. 10D) which in turn result in a shift of the zero crossings.

The above shift of zero crossings introduced by capacitive coupling of the amplitude-limiter transistor stages is actually a frequency shift for the positive and negative going zero crossing. In other words, the amplitude modulation present in the incoming sinusoidal signal, which shifts operation point or the d.c. bias level of the amplifier stage causing the zero crossing to be shifted, is converted to frequency modulation when a detector or demodulator is utilized of the type which is responsive to positive or negative going zero crossings. This conversion of amplitude modulation to frequency modulation in an FM system is particularly undesirable when it is realized that amplitude modulation is frequently present in an FM signal due to noise, interferring signals, transmission path effects, selectively of tuned circuits, etc.

The above-described conversion of amplitude modulation to frequency modulation of an FM signal, which occurs when capacitive coupling to an FM signal is employed in an amplitude-limiter, is substantially reduced by the amplitude-limiter stages 51 and 54 of this invention. Specifically, the amplitude modulation to frequency modulation conversion has been substantially eliminated by direct coupling the transistor amplifying stages of the amplitude-limiters.

RC Pulse Shaping Network

The RC pulse shaping network 55 includes a capacitor C22 and a resistor 275 connected as a differentiator between the output line 56 of the amplitude-limiter 54 and the series connected resistors 276 and 277 whose function is described hereafter. The time constant of the RC differentiating network is of the same order or less than one-half the period of the highest radio frequency signal. A capacitor C23 connected between the positive line 240 and the junction of resistors 275 and 276 functions as an a.c. bypass capacitor capable of bypassing signal frequencies of both the radio frequency carrier and the audio information. The output of pulse shaping network on lin e57 is taken at the junction of capacitor C22 and resistor 275. The pulse shaping network 55 differentiates the amplitude-limited square wave output 61 from the amplifier-limiter 54, producing the differentiated waveform 62 on line 57.

DETECTOR

The pulse counting detector 58 includes a PNP transistor 280 having an emitter 281 connected directly to the positive line 240, and a collector 282 connected to the negative line 247 via the load resistor 277. The collector 282 is also connected to the base electrode 285 of the transistor 280 via d.c. feedback resistor 276 and the resistor 275 of the differentiator. The transistor 280 further includes a base 285 coupled directly to the output line 57 of the differentiator of shaping network 55. The collector electrode 282 of the transistor 280 constitutes the output of the pulse counting detector 58 on line 59. A capacitor C24 connected between the output line 59 of the pulse counting detector 58 and the positive line 240 is provided to bypass radio frequency signals from the output of the detector.

It is important to note that the pulse counting detector 58 is provided with a d.c. feedback path including resistors 276 and 275. This feedback path, by raising the potential of the junction between resistors 275 and 276 to higher levels as the transistor conducts increasingly more due to increased frequency signals input thereto from the pulse shaping network 55, is effective to provide a substantially wider band detector. The manner in which this feedback enables the bandwidth of the detector to be enlarged can be more understood by first considering detector operation without such feedback and by reference to FIGS. 15A, 15B, 16A, 16B, 17A, and 17B.

Figure 15A:
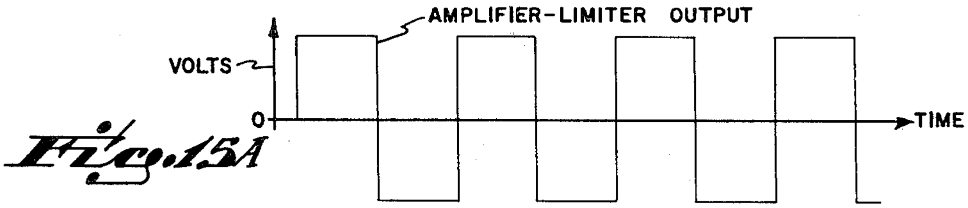
Figure 15B:
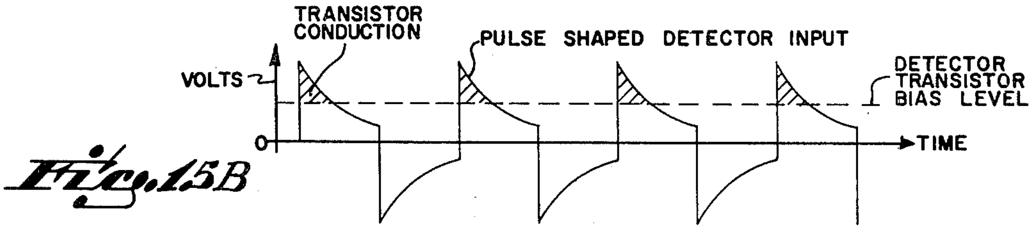

A detector of the general type shown in FIG. 7, without the feedback provided by the resistor 276, has, for a given input amplitude pulse level, a fixed forward bias level as shown in FIG. 15B. When the amplitude of the input signal passes above this bias level the detector transistor 280 conducts. A pulse waveform of the type shown in FIG. 15A when input to the pulse shaping network 55 produces on output line 57 a differentiated waveform of the type shown in FIG. 15B. The waveform depicted in FIG. 15B when input to a pulse detector of the general type shown in FIG. 7, but not having feedback, causes the detector transistor 280 to conduct whenever the waveform exceeds the d.c. bias level established by the input diode voltage drop of the base-collector junction, producing at the output of the transistor on line 59 a series of pulses. One current pulse is produced for each cycle of the differentiated input signal. Hence, the average current through the load resistor 277 is a direct function of the signal frequency. The average current through the emitter-collector path of transistor 280 and through the load resistor 277 is low, for low frequency input signals and high for a high frequency input signal. Thus, a detector circuit of the type shown in FIG. 7, modified to have no feedback, functions as an FM detector when frequency-modulated, amplitude-limited RF signals are input, the average output current being substantially directly related to the frequency or number of cycles per second.

The radio frequency range in the high frequency range of a frequency counting detector of the type shown in FIG. 7 which has no feedback can be greatly extended by providing feedback, such as provided by resistors 275 and 276. In addition, the inclusion of feedback in the pulse counting detector can also stabilize the transistor operating or d.c. bias point. Feedback in the pulse counting detector has a further and even more important result, namely, it makes it possible to make the output of the pulse counting detector approximately proportional to the frequency rather than a substantially direct function of the frequency or number of cycles per second.

The inclusion of the feedback resistor in a pulse counting detector functions to accomplish the above results by down-shifting the reference voltage level of the differentiated input signal 62 on line 57 which is input to the transistor 280. The effect of lowering the reference level of the pulses input to the detector transistor 280 as the frequency of the differentiated input signal increases and thereby shifting downwardly the voltage of the input pulses, is to cause the transistor 280 to conduct over lesser angles each cycle as the frequency increases. The decrease in conduction angle per cycle with increased input frequency to the detector is not so sharp as to over-compensate for the increased average d.c. conduction produced by the increased pulse rate at higher frequencies.

Figure 16A:
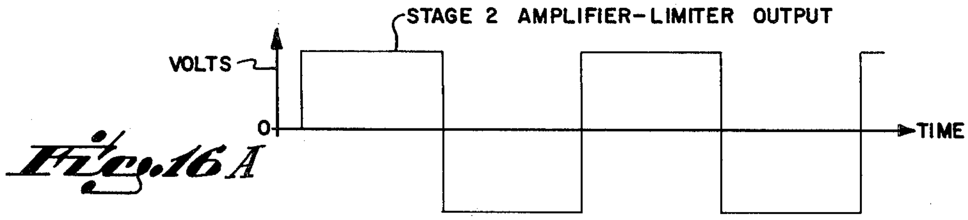
Figure 16B:
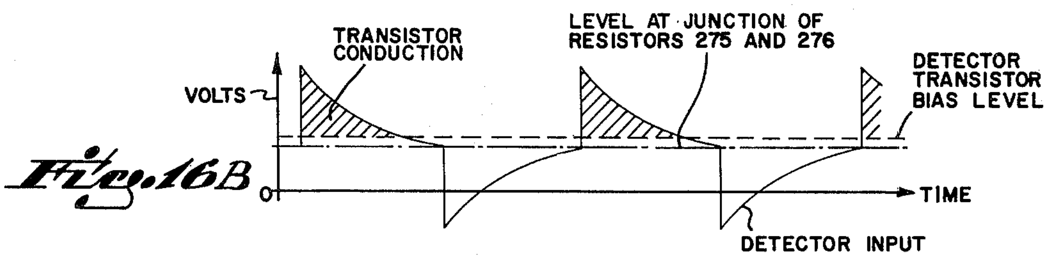
Figure 17A:
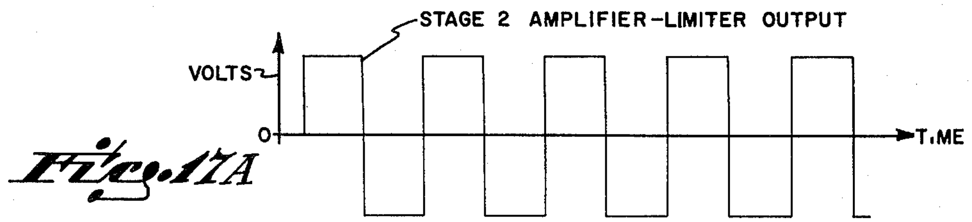
Figure 17B:
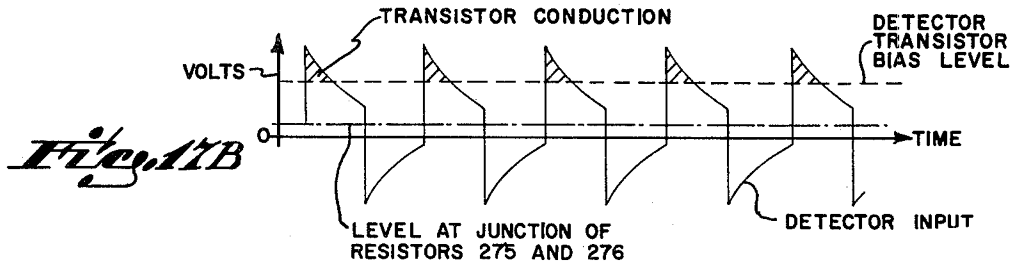

The above conduction angle decrease at higher frequencies, which is produced by employing feedback in the detector 58, becomes clear with reference to FIGS. 16A, 16B, 17A, and 17B. With a low frequency pulse output, of the type shown in FIG. 16A, from the amplitude-limiter 54, a differentiated waveform of the type shown in FIG. 16B is input to the pulse counting detector 58 on line 57. This low frequency input produces a high voltage level at the junction of resistors 275 and 276, which up-shifts the pulses, as shown in FIG. 16B. The transistor 280 conducts for only that portion of each cycle during which the differentiated input of FIG. 16B is above the bias level. When the frequency of the output of amplifier-limiter 54 is increased, as shown by the waveform of FIG. 17A, a higher frequency differentiated waveform of FIG. 17B is input to the pulse counting detector 58 on line 57. This higher frequency differentiated waveform, due to the feedback network including resistor 275 and 276, produces a lower voltage level at the junction of resistors 275 and 276, down-shifting the pulses, as shown in FIG. 17B. The d.c. bias level is the same at both high and low frequencies. The decreased voltage level of the junction of resistors 275 and 276 at higher frequencies causes the conduction angle per cycle of transistor 280 to be less than the conduction angle per cycle present at lower frequencies. However, the feedback is not so large and the junction voltage level so low as to cause the conduction angle per cycle to be reduced so sharply at higher frequencies as to prevent the d.c. current level per unit time to decrease or remain constant as the pulse frequency increases.

Thus, as shown by FIGS. 16A, 16B, 17A, and 17B, the detector 58 of FIG. 7 which is provided with feedback automatically adjusts itself so as to reduce at higher frequencies the conduction angle per cycle of the detector output pulse, thereby reducing the average current per cycle through the collector of transistor 280 in a manner which opposes, but does not overcome, the increase in average current per unit time due to the greater number of pulses per unit of time at higher frequencies. The net result of such compensation is to flatten the a.c. transfer slope of the conventional frequency counting detector, that is, of the detector not provided with feedback. This is evidenced from a comparison of the a.c. transfer characteristics of the conventional frequency counting detector having no feedback depicted in FIG. 18A and the a.c. transfer characteristic of the frequency counting detector of this invention having feedback depicted in FIG. 18B. It is evident by comparing FIGS. 18A and 18B that the improved detector circuit of this invention is an effective frequency demodulator over a much wider frequency range than is the conventional detector not having feedback of the type provided in this invention.

In addition, it is evident that the slope of the a.c. transfer characteristic curve provided by the improved detector of this invention becomes flatter at high frequencies, giving a lower detector output change for a given change in frequency at the high end of the frequency range. This is highly desirable in many applications inasmuch as the output change per unit change in frequency, provided by the detector of this invention, decreases at the high end of the frequency range. For example, if a frequency counter of the conventional type having no feedback and designed to cover the frequency range of 50 k.c. to 300 k.c. is input with a 100 k.c. signal deviated ± 10 percent, the detector output has an amplitude of some arbitrary value, as for example $V_1$. If the same conventional detector is now fed a 200 k.c. signal deviated ÷ 10 percent, the output now has an amplitude of approximately twice that present with the 100 k.c. input signal, notwithstanding the same percentage frequency deviation. The improved pulse counting detector of this invention having feedback, if designed to cover the same range, namely, 50 k.c. to 300 k.c., when input with a 100 k.c. signal deviated ± 10 percent produces an output having an amplitude of some arbitrary value, for example $V_a$. However, when the improved detector of this invention is fed a 200 k.c. signal deviated ± 10 percent, an output is produced having an amplitude that is substantially less than twice that produced by the 100 k.c. signal. While there is an increase in the output signal from the detector produced as a result of the higher frequency of the input signal, the increase produced by the improved detector of this invention is substantially less than that present with the conventional detector having no feedback. In fact, with proper adjustment of the circuit constants of the detector circuit it is possible to produce approximately the same voltage output at 200 k.c. (± 20 k.c.) as it is at 100 k.c. (± 10 k.c.) for a constant percentage frequency deviation.

RF FILTER

A radio frequency filter 286 including a resistor 287 and a capacitor C25 series connected between the output line 59 of the detector 58 and the positive line 240 is provided to filter out radio frequency signals from the pulse detector 58. The output of the filter 286 is taken at the junction 288 of resistor 287 and capacitor C25.

AUDIO AMPLIFIER

The audio output amplifier 60 inlcudes a transistor 290 having an emitter 291 connected directly to the positive line 240 and a collector 292 connected in series with the coil 293 of the headphone set, the series combination being connected in turn to the negative terminal of the potential source 233. The transistor 290 further includes a base electrode 294 capacitively coupled to the output line 288 of the radio frequency filter 286 via a capacitor C26 and a volume varying potentiometer 295 A feedback network connected between the collector electrode 292 and the base electrode 294 is provided for altering the d.c. feedback and, hence, the operating point of the transistor 290 for the purpose of enabling the transistor to operate in a Class A mode of operation. A capacitor C27 connected between the junction of feedback resistors 296 and the positive line 240 is provided to bypass audio frequency signals, preventing such signals from being fedback to the base circuit of the transistor 290. A capacitor C28 connected across the potential source 233 filters out any high frequency transients which might be generated by the d.c. source 233 and associated circuitry.

The audio amplifier 60, by the inclusion of the feedback network including resistors 296 and 297, is capable of automatically compensating where polarized headphones are used, for headphones of different impedances, such compensation not being possible in similar audio amplifiers not including such feedback. The conventional Class A amplifier typically used for operating polarized headphones does not include feedback of the type used in this invention. Consequently, the biasing of the transistor audio amplifying stage is constant, establishing a constant operating point for the transistor amplifier. Such an audio frequency circuit without feedback suffers from the defect that it can only be used with polarized headphones having one value of a.c. impedance and one value of d.c. resistance. Should the circuit be used with a different set of polarized headphones having a different a.c. impedance and a different d.c. resistance, the fixed operating point of the conventional amplifier prevents the transistor from providing a different d.c. polarizing current for the headphone as is necessary with polarized headphones of different impedance and resistance. The improved amplifier 60 of FIG. 7, which includes feedback, overcomes the above-noted limitation by providing the current polarization current for different impedance polarized headphones. In addition, the feedback of the improved circuit of this invention is also effective to alter the operating point of the transistor amplifying stage so as to keep it in a Class A mode.

In operation, if lower than usual impedance polarized headphones are used, the voltage drop across the headphone coils is small and the feedback network including resistors 296 and 297 conducts a greater than normal current to the base 294 of the transistor 290. This in turn causes the current through the emitter-collector path of the transistor 290 to increase thereby providing the higher polarizing current required by the low impedance polarized headphones, as well as the higher current necessary for proper Class A operation with a low impedance load. Similarly, should a higher than normal impedance headphone having high d.c. resistance be utilized, there is a large voltage drop across the headphone coils, causing the feedback resistors 296 and 297 to conduct less current to the base 294 of transistor 290. The decrease current into the base circuit of transistor 290 causes a decrease in current through the emitter-collector path of the transistor, thereby providing the lower polarizing current required by higher impedance polarized headphones, as well as the lower current necessary for Class A operation with a high impedance load.

A very important advantage of the receiving unit 11 constructed in accordance with the principles of this invention is that it does not require tht the amplifier-limiter and detector have narrow bandwidths or that they be selectively tunable t the band of the channel to be received. In addition, the receiver of this invention does not require that the bandwidth of the amplifier-limiter or detector be centered on the carrier frequency of the particular channel to be received. Not requiring the amplifier-limiter and detector bandwidths to be centered on the carrier frequency of the desired channel or to reject all frequencies other than the band of the channel to be received permits wide band amplifier-limiters and detectors to be used. Such wide band non-syncronously tuned detectors and limiters result in a considerable reduction in the complexity of a receiver when it is required to operate with many different radio frequency channels at many different frequencies.

With the receiver construction of this invention the only band requirements are that the antenna and tuned circuit 50 be selectively tunable to cover the bandwidth of the desired channel and that the bandwidth of both the amplifier-limiter 51, 54 and detector 58 be broad enough to include the system bandwidth, that is, to broad enough to include all the bands of the various channels 1–4. The bandwidth of the amplifier-limiter 51, 54 at its upper frequency range is preferably capable of passing frequencies of from 3 to 6 times greater than the highest carrier frequency. Since the amplifier-limiter is processing rectangular waves which contain only odd harmonics of the fundamental frequency, to avoid serious distortion of the square waves it is necessary that the amplifier-limiter be capable of passing at least the third harmonic of the highest carrier fundamental frequency. For example, in the receiving system of this invention assuming transmission of four channels centered on 185 k.c., 230 k.c., 285 k.c., it is only necessary that the amplifier-limiter 51, 54 have a bandwidth of from 180 k.c. to approximately 1 m.c. The detector need only have a range or band of from 180 k.c. to 350 k.c. corresponding to the system bandwidth. Thus, it is not necessary with the receiver of this invention that narrow band and/or tunable amplifier-limiters and detectors passing only one channel at a time be used. Nor is it required that the amplifier-limiter and detector bands be centered on the carrier frequency of the channel being received.

In a typical classroom teaching application where it is desired to simultaneously transmit different instructional material to groups of students having differnt learning abilities, the instructor sets-up the transducing devices 36–39 so as to provide on output lines 40–43 the desired instructional material. For example, if the transducing devices 36–39 are magnetic tape recorders, the tape drive motors are energized to draw the magnetic tape past their respective transducing heads. If, on the other hand, the transducing devices are phonograph records, the tone arms are engaged with the appropriate grooves on the phonograph records and the phonograph records operated at the appropriate speed. The switches 31–34 are placed in the positions shown in FIG. 1, thereby connecting the audio signals output on lines 40–43 of the transducing devices to the audio input lines 16–19 of the transmitters 12–15. The power supply 45 is energized by connecting the on-off switch between the transformer 225 and the wall outlet. This provides the necessary operating power for the various components of the transmitters and microphone preamplifier.

The audio frequency signals input to the transmitters 12–15 on lines 16–19 are input to the audio amplifier and limiter 65 of their respective transmitters. Considering the transmitter of FIG. 3, the audio frequency input from the transducing devices is input to the base of transistor 80 where suitable amplification and amplitude limiting takes place. The output from this amplifying and limiting stage is taken from the transistor collector 82 and input to the multivibrator 68 and the audio level detector and amplifier 76. In the audio level detector and amplifier 76 the lamp 113 is illuminated at an intensity corresponding to the modulation level of the input audio frequency signal on line 66. In the multivibrator oscillator 68 the amplified and amplitude limited audio frequency signal is coupled to the base of transistors 120 and 121. The frequency of the multivibrator oscillator 68 is caused to increase for high amplitude positive audio frequency input signals and decrease for high amplitude negative input signals, thereby frequency modulating the complimentary multivibrator oscillator outputs taken at lines 69A and 69B. Frequency variation of multivibrator oscillator 68 is produced by varying the charging rates of capacitors C8 and C9.

The complimentary oscillator outputs on lines 69A and 69B are input to transistors 132 and 133 of the buffer amplifier 70A. The transistors 132 and 133, like the multivibrator oscillator transistors 120 and 121 are, at any given time, in opposite conduction states, the particular state of a given transistor depending on the polarity of the complimentary oscillator output signal input to the base of the transistors. The buffer amplifier outputs taken at the junctions 155 and 156 (see FIG. 9A) are fed to the RC shaping networks 160 and 161 where a reduction or decay in amplitude of the signals for a fraction of the period occurs as shown in FIG. 9B. The decaying amplitude signals from the pulse shaping networks 160 and 161 are input to the Class C output amplifier 72 on lines 71A and 71B. The decaying amplitudes of inputs to transistors 120 and 121 insure proper Class C operation of the amplifier 72 as shown in FIG. 9D. The transistor 170 and 171 of amplifier 72 are connected in pushpull configuration and drive the output tuned circuit 74, providing an output across the secondary winding 185 which appears across lines 75A and 75B. In a manner explained in detail earlier in conjunction with FIGS. 11–14, the voltage output across lines 75A and 75B is maintained at a substantially constant level as the output from the multivibrator oscillator 68 varies off resonance.

The outputs from the various channel transmitters 12–15 taken across the secondary windings 185-1 through 185-4 are coupled to the loop antenna and tuned circuit 24 via the coupling arrangement depicted in FIG. 6. Relatively interference free transmission is provided by the loop antenna and tuned circuit 24 by reason of the unique and unobvious manner of frequency spacing the carriers as well as by the unobvious manner used to couple the various transmitter outputs, which have both been explained in detail previously.

The students in the classroom tune their respective receivers to the desired channels by connecting the appropriate one of the taps 230-1 through 230-4 corresponding to the desired channel to the input line 52 of the self-biasing direct coupled amplifier-limiter stage 51. With the appropriate tap on the inductor 230 connected to the input line 52, the desired FM signal channel is filtered from the four simultaneously transmitted FM channel signals and coupled to the base 250 of the transistor amplifier-limiter 51. It is noted that the coupling from the loop antenna and tuned circuit 50 to the amplifier-limiter 51 is direct to prevent shifts in the operating point of the transistors 234, 235 and 236 as the amplitude of the input signals varies due to stray and undesired amplitude modulation in the incoming signal. This direct coupling, in the manner described previously in conjunction with FIG. 10, prevents zero shifts, thereby avoiding conversion of amplitude modulation to frequency modulation.

The output of the amplifier-limiter 51 is taken at the collector 233 of the third transistor stage 236 and coupled to the first transistor stage 260 of the amplifier-limiter stage 54. After suitable amplification and amplitude limiting in the amplifier-limiter 54, an output is produced which is fed to the RC pulse shaping network 55. The pulse shaping network 55 is in the form of a differentiator having a time constant equal to or less than one-half of the period of the signal input thereto. The pulse shaping network 55 produces sufficient decay in signal amplitude so as to produce somewhat sawtooth waveform on output line 57 as shown in FIGS. 16B and 17B. The decayed amplitude waveform output on line 57 is input to the pulse counting detector 58. The pulse counting detector 58, via a suitable feedback network which inlcudes resistors 275 and 276, down-shifting the pulses input on line 57 as the frequency of the pulse counting detector input increases as shown in FIGS. 16B and 17B. This downshifting of the detector input pulses at increased pulse frequency causes the pulse counting detector transistor 280 to conduct for a lesser angle each pulse period as the frequency of the pulses input thereto increases. The decrease in conduction angle at increased frequency causes the rate of change of the d.c. output level of transistor 280 to decrease as the frequency increases, causing an output on line 59 to be produced which is the amplitude versus frequency response discussed in connection with FIG. 18B.

The output from the detector on line 59 is passed through an r.f. filter 286 where suitable filtering occurs and then is input via a volume control potentiometer 295 to the audio output amplifier 60. The transistor 290, which comprises the amplifying stage of the audio output amplifier 62, via suitable feedback network described previously, functions to provide an output to the headphone winding 293 of the sound reproducing unit 63 which is of substantially constant voltage level regardless of the impedance of the winding 293.

Should the instructor desire to interrupt the transmission of instructional material to one or more of the student groups tuned to different ones of channels 1 through 4, one or more of the switches 31–34 are transferred from the position shown. With the appropriate one or more of the switches 31–34 transferred, the corresponding transducing devices 36–39 are decoupled from the transmitters 12–15 and instead the microphone preamplifier 25 is coupled. This enables the instructor to provide on input line 26 an audio frequency signal to the microphone preamplifier and provide an output line 27 an input to the transmitters 12–15 which have had their associated switches 31–34 transferred. The microphone preamplifier 25, because of the unique feedback network included therein, which has been described in detail previously, provides a substantially uniform voltage output on line 27 regardless of the output impedance of the particular microphone connected to input line 26.

While the various principles of this invention have been described with respect to a preferred embodiment, those skilled in the art will appreciate that numerous modifications can be made without departing from the spirit and scope of the invention. It is contemplated that the communication system of this invention, in addition to being used in a shorthand teaching environment, will also find substantial utility in other environments. For example, the communication system of this invention may be utilized in telemetering applications as well as in simultaneous language translation and transmission applications such as are utilized in meetings wherein a speaker's comments in one language are simultaneously translated into a variety of other language and transmitted to the audience who can then listen to the translation of their choice.

It is also contemplated to be within the scope of this invention to use more or less than four channels, as well as different channel carrier frequencies. In the selection of the carrier frequency the principal requirement is that the spacing between adjacent channels be such that undesirable difference sidebands are not produced which lie in the information frequency band. Such undesirable difference sidebands can be avoided by spacing the channels such that for any given channel the spacing on one side exceeds the spacing on the other side by an increment equal to at least twice the highest frequency of the information band. As for the types of the circuit components described and their values, it will be understood by those skilled in the art that these are only preferred and that numerous changes can be made without departing from the inventive principles disclosed herein.

Having described the invention, what is claimed is:

1. A pulse counting detector for frequency modulated, amplitude limited radio frequency signals, said detector comprising:

a transistor having an input circuit and an output circuit;

means to bias the transistor to conduct when the signal present at said input exceeds a predetermined level;

a radio frequency by-pass network connected to said output circuit for converting the radio frequency output of said transistor to an audio-frequency demodulation signal;

a differentiating circuit having a time constant of the order or less than one-half the period of the highest r.f. signal, said differentiating circuit being coupled to said input circuit of said transistor and responsive to said amplitude limited r.f. signals for providing said transistor input circuit with differentiated pulses which render said transistor conductive throughout a conduction on angle corresponding in duration to the duration said differentiated pulse exceeds said predetermined level; and a negative d.c. feedback network connected between said input and output circuits for shifting the d.c. level of said differentiated pulses as the frequency of said pulses increase, thereby reducing the conduction angle and current pulse width of said transistor per cycle of input signal to effect a decrease in the rate of increase of the output circuit current of said transistor per unit time as the frequency of said pulses increases whereby the a.c. transfer characteristic of said detector in the high frequency range is expanded and the slope reduced.

* * * * *